United States Patent [19]
Song et al.

[11] Patent Number: 5,926,594
[45] Date of Patent: Jul. 20, 1999

[54] SYSTEM AND METHOD FOR ALIGNING AND ATTACHING OPTICAL FIBERS TO OPTICAL WAVEGUIDES, AND PRODUCTS OBTAINED THEREBY

[75] Inventors: Ike J. Song, Montebello, Calif.; Richard D. Hatch, Sandy, Utah; Youngmin A. Choi, Agoura Hills, Calif.; Clifton T. Council, Woodland Hills, Calif.; Thomas G. Council, Camarillo, Calif.; Daryl K. Sakaida, Northridge, Calif.; Henry C. Abbink, Westlake Village, Calif.; John A. Healey, Van Nuys, Calif.; Ricardo J. Rosete, Oxnard, Calif.

[73] Assignee: Litton Systems, Inc., Woodland Hills, Calif.

[21] Appl. No.: 08/473,127

[22] Filed: Jun. 7, 1995

Related U.S. Application Data

[63] Continuation of application No. 08/300,901, Aug. 31, 1994, abandoned.

[51] Int. Cl.[6] .................................................. G02B 6/30
[52] U.S. Cl. ................................ 385/49; 385/52; 385/15
[58] Field of Search ................................. 385/49, 15, 51, 385/52, 147, 25

[56] References Cited

U.S. PATENT DOCUMENTS

| | | | |
|---|---|---|---|
| 4,744,619 | 5/1988 | Cameron | 385/49 |
| 4,836,645 | 6/1989 | Lefevre et al. | 385/49 |
| 4,976,506 | 12/1990 | Pavlath | 385/49 |
| 5,107,535 | 4/1992 | Hakogi | 385/49 |
| 5,278,934 | 1/1994 | Jordan | 385/147 |

(List continued on next page.)

FOREIGN PATENT DOCUMENTS

| | | |
|---|---|---|
| A0 126 003 | 11/1984 | European Pat. Off. . |
| A0 170 457 | 2/1986 | European Pat. Off. . |
| A0 428 049 | 5/1991 | European Pat. Off. . |

(List continued on next page.)

OTHER PUBLICATIONS

Journal of Optical Communications, vol. 10, No. 2, Jun. 1989, pp. 54–55, Bahadori et al.: "Automated Fiber–Waveguide Array Alignment".

IEEE Photonics Technology Letters, vol. 6, No. 6, Jun. 1994, New York, US, pp. 728–729 Caponio et al.: "A Simple Angular Alignment Technique for a Polarization–Maintaining–Fiber".

(List continued on next page.)

*Primary Examiner*—John D. Lee
*Assistant Examiner*—Ellen E. Kang
*Attorney, Agent, or Firm*—Lewis B. Sternfels

[57] ABSTRACT

An input optical fiber (22), an output optical fiber (24, 26) and a waveguide (14) in an integrated optic chip (IOC) (12) intermediate the fibers are coupled together using service and alignment robots (42; 48, 50, 52). The service robot (42) establishes the three dimensional position of the waveguide. The alignment robots (48, 50, 52) three dimensionally and angularly align the input and output fibers respectively to the input and output legs (16; 18, 20) of the waveguide. An adhesive applying tool (46) coupled with the service robot adheres the input and output fibers respectively to their waveguide input and output legs. Included are specifics for an optical fiber clamp (110) capable of maintaining the orientation of a fiber while it is moved to another location, a vacuum holder (210) for holding and rotating an optical fiber for polarization purposes, goniometer mapping and positioning of an optical fiber with respect to the pivotal axis of the goniometer (324), initial light launching of an optical fiber to a waveguide using the fiber (422) in its cladding mode, planar and angular position alignment of optical fibers to optical waveguides, an alignment procedure for establishing a gap between waveguides, and attaching optical waveguides together.

12 Claims, 12 Drawing Sheets

Microfiche Appendix Included
(2 Microfiche, 151 Pages)

U.S. PATENT DOCUMENTS

| | | | |
|---|---|---|---|
| 5,317,452 | 5/1994 | Prentiss et al. | 358/819 |
| 5,381,494 | 1/1995 | O'Donnell et al. | 385/91 |
| 5,604,832 | 2/1997 | Hall et al. | 385/89 |

FOREIGN PATENT DOCUMENTS

| | | |
|---|---|---|
| A2 611 923 | 9/1988 | France . |
| A2 660 443 | 10/1991 | France . |
| A40 15 978 | 11/1991 | Germany . |
| A59-026711 | 2/1984 | Japan . |
| A61-256309 | 11/1986 | Japan . |
| A2 239 091 | 6/1991 | United Kingdom . |
| WO A92 12246 | 7/1992 | WIPO . |
| WO A92 16860 | 10/1992 | WIPO . |
| WO A94 06044 | 3/1994 | WIPO . |

OTHER PUBLICATIONS

N.E.C. Research and Development, No. 60, Jan. 1981, Tokyo, Japan, pp. 15–18, Naruse et al.: "Automatic Optical Axes Manipulating System for Optical Fiber Communication Devices".

Applied Optics, vol. 23, No. 15, Aug. 1, 1984, Washington, US, pp. 2643–2648, Fujise et al.: "Core Alignments by a Simple Local Monitoring Method".

Soviet Journal of Quantum Electronics, vol. 17, No. 2, Feb. 1987, New York, US, pp. 264–266, Zolotov et al.: "Rigid Contact Between a Channel $LiNbO_3$:Ti Waveguide and Single–Mode Fiber Waveguides".

Journal of Lightwave Technology, vol. LT–5, No. 12, Dec. 1987, New York, US, pp. 1716–1720, Yamada et al.: "Single–Mode Optical Fiber Connection to High–Silica Waveguide with Fiber Guiding Groove".

United Technologies Photonics, Bloomfield, CT, Data Sheet (4 pages), Mar. 1993: "APE™ Fiber Optic Gyro (FOG) Circuit".

Photonics Spectra, Aug. 1994, p. 126, referencing (1) a Melles Griot "NanoTrak™ Automatic Fiber Alignment" (see sheet attached to cited document) and (2) a Newport Corporation "AutoAlign™ Positioning System" and its patent 5,278,934 (referenced above and submitted herewith).

The 1994 Newport Catalog, No Month 1994, Title page, page with "Certificate No.: FM 27207," pp. 3.20 and 6.16–6.18, and "Ordering Information" page.

Publication "Nanopositioning Guide" of Melles Griot Inc., No Month 1993, front cover, backside of front cover, pp. D.7–1 through D.7–10 relating to "NanoTrak™ Autoalignment" and back cover.

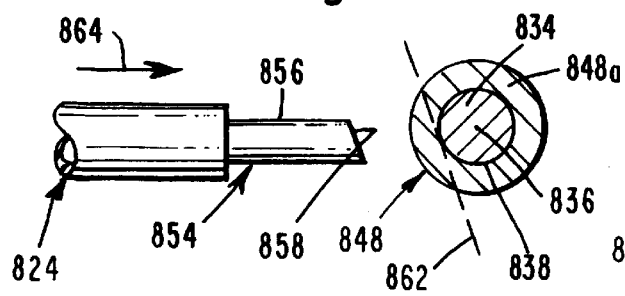
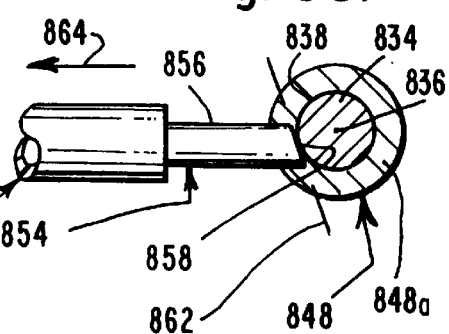
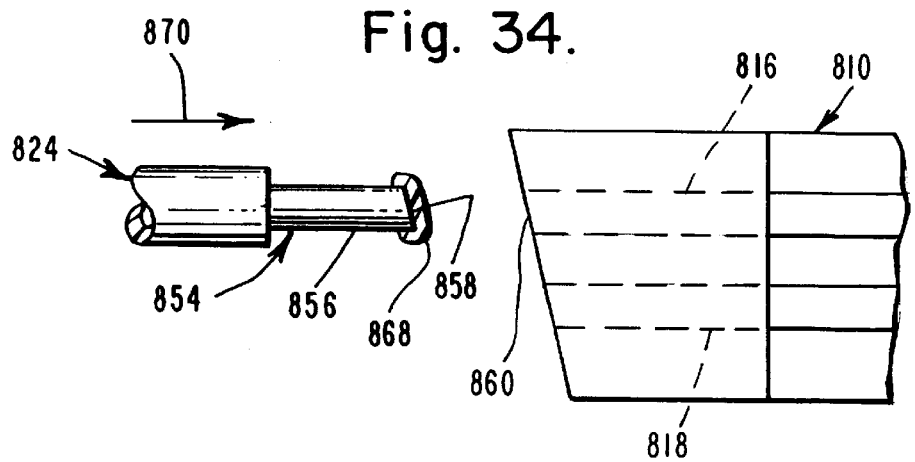
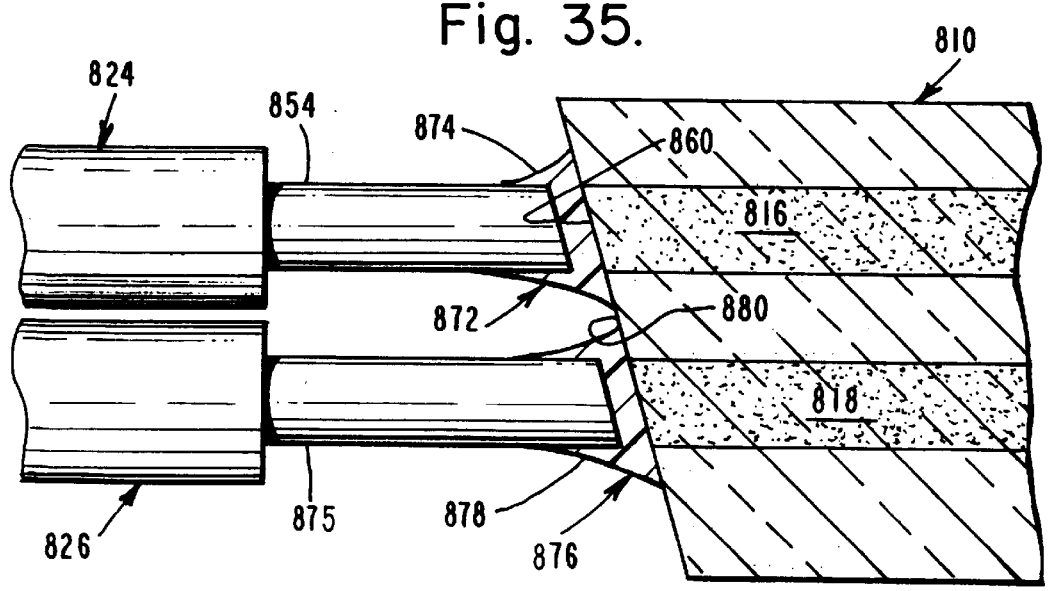

SYSTEM AND METHOD FOR ALIGNING AND ATTACHING OPTICAL FIBERS TO OPTICAL WAVEGUIDES, AND PRODUCTS OBTAINED THEREBY

This is a continuation of application Ser. No. 08/300,901 filed Aug. 31, 1994 abandoned.

REFERENCE TO MICROFICHE APPENDIX

Attached hereto and incorporated herein is microfiche Appendix A. Appendix A is the source code implementation in Forth computer program language for the computer programs which program (configure) the processors and computers disclosed herein to implement the methods and procedures described herein. Appendix A consists of 1 title page and 2 fiches containing the images of 151 pages of code. This source code is subject to copyright protection. The copyright owner has no objection to the facsimile reproduction of the patent disclosure, as it appears in the Patent and Trademark Office patent files or records, but otherwise reserves all copyright rights whatsoever.

BACKGROUND OF THE INVENTION

1. Field of the Invention

The present invention relates to a system and method, and products obtained thereby, for aligning and attaching optical fibers to conductors of optical energy. The preferred use of the present invention is the alignment and attachment of optical fiber pigtails to waveguides, such as are in integrated optic chips (IOCs). Therefore, the term "waveguide" is intended to describe all tangible media which is capable of carrying or transmitting signals comprising optical energy.

2. Description of Related Art and Other Considerations

While the present invention is applicable to providing a system and method and products obtained thereby, generally for aligning and attaching optical fibers to conductors of optical energy between a pair of optical waveguides, it was conceived specifically for securing optical fiber pigtails to waveguides in an integrated optical chip (IOC). Accordingly, the subsequent discussion will be directed to this specific use; however, it is to be understood that the present invention has general application to alignment and attachment of optical fibers to optical waveguides and, therefore, it is not intended that the present invention be limited to its specific use.

The proper alignment and attachment of optical fiber pigtails to other waveguides, particularly to integrated optic chip waveguides is of critical importance in minimizing attenuation and other losses in signal transmission. Existing methods and apparatus for accomplishing such proper alignment and attachment are expensive and time consuming and can still be subject to some such attenuation and other losses in signal transmission. Techniques not only require skilled labor; often, these techniques are more in the nature of an art which cannot easily, if at all, be transferred to other workers.

A common problem arises with conventionally supplied integrated optical chips. Manufacturers of these chips generally produce the chips with optical fibers or "pigtails" attached to the ends of the waveguides of the chips. Users of these chips then secure them into their systems by attaching further optical fibers to these pigtails. Thus, there are two pigtail attachments, first to the chip waveguide and second to the optical fiber. It is known that, whenever there is such an attachment, there is some loss or attenuation, albeit ofttimes small, in transmission of the optical signal. If repeated throughout the system, the accumulated attenuation can result in significant loss. Therefore, great care is taken to avoid such degradation in signal loss or attenuation, such as by very careful alignment and use of proper adhesive materials.

State of the Art Regarding Optical Fiber Clamps

A fiber clamp is used to hold an optical fiber in an oriented position for a variety of operations, such as for maintaining a desired angular or polarized orientation of the core during cleaving, and for aligning and attaching it to a waveguide or other optical device. Commercially available clamps employ a variety of V-groove and slotted configurations to align the fiber. In addition, most of these clamps are not transferrable, that is, they are fixed in position and thus restricted to a specific operation. One clamp which is transferrable, however, is contained within its own strip, cleave, splice and rejacket machine and, therefore, is confined within a limited range of operations.

These clamps have several limitations. While V-grooves make insertion relatively easy, they present sharp corners and edges which can easily subject the cladded core of the stripped fiber to damage. V-grooves are also difficult to machine and polish to the accuracy required. On the other hand, slots, as distinguished from V-grooves, are relatively easy to machine but it is very difficult to manually load free fiber into them. Slots also provide only one surface of interface which, in turn, can cause distortion of the fiber cylindrical geometry and poor lateral alignment after clamping. Like V-grooves, slots also have sharp corners, and likewise subject the cladding to damage.

State of the Art Regarding Optical Fiber Holders

One apparatus used to effect such rigid holding has a trough or U-shaped channel which is configured closely to the circumference of the optical fiber. A vacuum is coupled to the U-shaped channel in order to secure the fiber to the fixture. Several problems exist with such structure. If the surfaces of the channel were not perfectly uniform and smooth, air would be drawn irregularly about the fiber and cause it to vibrate. Such vibration precludes effective alignment. This lack of uniformity and smoothness of the channel is compounded when there are small variations in the diameter of the fiber which will also contribute to vacuum leakage and resulting vibration of the fiber. Further, other irregularities in the U-shaped channel may score and damage the fiber. Therefore, for this additional reason, it is imperative that the U-shaped channel be as smooth as possible. Obtaining such a smooth channel is costly.

State of the Art Regarding Goniometers

To obtain precise alignment between optical waveguides, such as optical fibers and the like, it is necessary that the fiber rotate within 0.5 microns of its core axis. Such rotation is effected by use of a goniometer whose typical range of rotation is ±25°. With current goniometer technology, a rotation of 0.5 microns of an optical fiber's core axis is not achievable. However, by "mapping" the exact location of a fiber core axis as it rotates, the fiber can be positioned using the mapping data so that it rotates within the desired 0.5 microns.

Two methods to solve this problem include the use of some mechanical means to tune the goniometer so that the fiber rotates to its core axis and to rotate the optical fiber to a desired angular position and then realign the core axis to the center of alignment. These methods have several disadvantages. The mechanical tooling method for a goniometer is a very time consuming task and then it can only give a rough alignment of core rotation to the center of alignment, the best result being about one order of magnitude worse than what is desired, that is 5 microns rather than 0.5 microns. The second method is also very time consuming. While accuracies of 0.5 microns can be achieved, realignment is required every time after the fiber is rotated. Therefore, for a typical fiber to integrated optic chip pigtailing or other alignments to a mating waveguide, approximately 250 fiber rotations are required with an average realigning time for the fiber to be 20 to 60 seconds.

State of the Art Regarding Launching of Light

The requirement to join optical fibers to waveguides having core and waveguide diameters of 6 microns is very difficult, in that it is extremely difficult and expensive to provide an alignment between the two, sufficient to enable at least an initial transmission of light. Conventionally, an CCD camera operating in the IR or visible spectrum and a lens are placed at the waveguide leg. While sufficient to provide the desired accuracy, such a camera and lens combination are bulky and expensive and, because of their size, it is difficult to design them into a system, especially where space is limited.

State of the Art Regarding Planar Alignment of Optical Fibers

The proper alignment of optical fiber pigtails to other waveguides, particularly to integrated optic chip waveguides is of critical importance in minimizing attenuation and other losses in signal transmission. Existing methods and apparatus for accomplishing such proper alignment are expensive and time consuming and can still be subject to some such attenuation and other losses in signal transmission. Techniques not only require skilled labor; often, these techniques are more in the nature of an art which cannot easily, if at all, be transferred to other workers.

State of the Art Regarding Angular Alignment of Optical Fibers

There are known methods for polarizing an optical fiber to a waveguide; however, they are expensive and not always accurate, for example, to obtain optical rotational alignment extinction ratios of −40 dB. As is known, the extinction ratio is the ratio of the power measurements of the fiber's current or present rotary polarization position to its current position plus 90°. Such existing methods are manually and incrementally effected, and often requires the operator to reverse direction after overshooting the mark.

State of the Art Regarding Establishing Gaps Between Optical Fibers and Waveguides When determining the gap between an optical fiber and waveguide, it is important to safeguard the fiber from harm, especially its cleaved end. Present methods are not capable of doing so, because they rely upon a delay in obtaining information of the fiber's present position. Thus, after initial contact is made, the fiber may be further and harmfully forced against the waveguide. These conventional methods for determining the gap simply involve a moving of the fiber towards the waveguide along the axis of the fiber. This exposes the cleaved fiber end to damage and makes it difficult to obtain accurate gap measurements.

State of the Art Regarding Attaching Optical Fibers Together

A pervasive problem occurring with respect to integrated optical chips is that they are generally produced and supplied with optical fibers or "pigtails" attached to the ends of the waveguides in the chips. Users of these chips then secure them into their systems by attaching further optical fibers to these pigtails. Thus, there are two pigtail attachments, one to the chip waveguide and another to the optical fiber. It is known that, for such attachments, there is some loss or attenuation, albeit ofttimes small, of the transmitted optical signal which, when added to other attachments throughout the system, can result in significant or at least undesired losses.

Such attachments are conventionally made by using an optically transmissive adhesive, such as an epoxy resin or an ultraviolet (UV) curing resin. An adhesive, such as an epoxy resin, can have a very short cure time, sometimes less than one minute. Therefore, it is imperative that the alignment between the core of the optical fiber and the waveguide be made expeditiously and without undue delay; otherwise, the attachment will not be effective. However, if the alignment and attachment are too rapidly made, a poor optical alignment and/or attachment may result.

Another concern, which relates to the use of adhesives which shrink upon curing or hardening, is to prevent contact and bridging of such adhesives with neighboring attachments between other fibers and waveguides. When there is such bridging contact, the shrinking causes the two pair of adjacent or neighboring optical fibers and waveguides to be drawn together, and exerts stress on the bonds and fibers and consequential detrimental harm, such as breakage. Thus, it is imperative that such neighboring attachments be separated by a gap to avoid undesirable bridging.

Therefore, great care must be taken to avoid such degradation in the signal. Such care invariably includes the use of expensive systems, devices and techniques to obtain very careful alignment, selection of proper adhesives, and the attachment in a limited amount of time. Skilled labor is required, with the attendant costs in its training and replacement. In addition, not every skilled worker is capable of effecting such attachments because many times they require the services of an artisan whose artistic capabilities are not necessarily replicable and transferrable to others and, therefore, whose loss may create great problems for the manufacturer.

SUMMARY OF THE INVENTION

These and other considerations and attendant problems are successfully addressed and overcome by the present invention.

Position Maintaining and Transfer Optical Fiber Clamp

A finely defined doubly arced groove is bounded at its ends by grooves having larger arcs. The grooves are aligned, so that a cladded core of an optical fiber or the fiber itself is guided by the larger arced grooves into the finely arced groove. A resilient pad or like means which is not damaging to the cladding is placed over the fiber in the finely defined arc groove to hold it in tangential contact against the arcs.

Preferably, the finely defined arced groove is formed by a pair of precision pins while the larger arcs are formed by two pairs of cylindrical pins which are relatively larger in diameter that those of the precision pins. In addition, to hold the fiber and/or its cladded core in position, such as for orienting its polarization axis during cleaving of its end, the resilient pad may comprise an elastomeric material capable of exerting a frictional engagement with the cladding. The large and small pins are held in a precision alignment plate, and the whole is assembled into a compact, self contained assembly.

Vacuum Holder for Optical Fibers

The holder provides minimum contact area of the optical fiber in its vacuum channel. Specifically, a pair of precision made gage pins are secured within a vacuum chuck and are spaced from one another to provide a vacuum opening. The gage pins are cylindrical or otherwise curved about their axes and are provided with relatively highly polished surfaces to provide a pair of essentially linear contacts for the fiber and, further, so as not to damage the fiber.

In addition, the holder can be used to rotate the fiber, by pressing it against a pad having a surface which provides a friction which is minimized on the gage pins. Upon movement of the vacuum chuck with respect to the pad, sufficient friction against the fiber holds it stationary against the pad, but permits it to rotate with respect to the stationary gage pins.

Goniometer Mapping and Positioning of an Optical Fiber with Respect to a Waveguide The exact location of the fiber core axis in the goniometer is mapped as it rotates, and the fiber is positioned using the mapping data so that it rotates within 0.5 microns of its core axis. Specifically, the optical fiber is moved to a known maximum aligned position and then rotated by rotating the goniometer to a predetermined angular resolution needed for the application under question. The goniometer is then linearly moved to realign the y and z axes to the maximum resolution of the known aligned position. The offsets are then found and stored in a calibration table. In use, to proceed to any desired angle or position, the y and z offsets are fetched from the calibration table for that angle and, simultaneously, the y and z stages under the goniometer are moved to that offset.

Initial Launching of Light Between an Optical Fiber and a Waveguide

An optical fiber is used in its cladding mode so as to function as a funnel in initial launching of light from a companion waveguide.

An optical fiber is approximately aligned to the chip waveguide, and then moved in one axis parallel to the chip while data of optical power relative to fiber position is acquired. If hysteresis is a problem, the fiber is moved in the opposite direction and the power to position data from this movement is averaged with the first obtained data to obtain an averaged maximum to position output. This data is stored for later alignment and attachment of the optical fiber to the optical waveguide.

Planar Alignment of Optical Fibers to Optical Waveguides

An optical fiber is approximately aligned to the chip waveguide, and then moved in one axis parallel to the chip while data of optical power relative to fiber position is acquired. If hysteresis is a problem, the fiber is moved in the opposite direction and the power to position data from this movement is averaged with the first obtained data to obtain an averaged maximum to position output. This data is stored for later alignment and attachment of the optical fiber to the optical waveguide.

Angular Position Alignment of an Optical Fiber with Respect to a Waveguide

The polarization axis of the fiber is rotationally aligned to the polarization axis of the waveguide, using the extinction ratio of the fiber as the maximizing variable.

Establishing a Gap Between an Optical Fiber and a Waveguide

The fiber is aligned to the waveguide at an unknown distance therefrom, and moved along the optical path to close the gap. Upon very slight touching of the fiber with the waveguide, movement of the fiber is stopped, the point of contact is recorded, and the fiber is moved back from the waveguide in preparation for further operations.

Attaching Optical Waveguides Together

Briefly, to attach together a pair of optical waveguides, of which optical fibers and waveguides in optical devices are examples, a measured and uniformly shaped dollop of optically transmissive adhesive is placed at the tip of one of the waveguides, with the adhesive being essentially confined to the sidewall behind the tip. This placement ensures that the resultant adhesive bond to the chip and its waveguide has a gradual taper. This taper is precisely controlled as a result of the carefully made dollop and enables the bond to be separated by a gap from another bond between an attachment of closely placed second waveguides. This gap between the first and second bonds avoids a bridge to any adjacent fibers and the undesired stress on the bonds between the two waveguide to waveguide attachments, and any optical fibers.

Specifically, a tool with rough cylindrical surface is dipped into an adhesive, such as an epoxy resin, to coat the surface with a small dollop of the adhesive. The dollop is shaped to provide a wall of substantially uniform thickness. The angled tip of the fiber is positioned parallel to a tangent to the tool's rough cylindrical surface, and then moved horizontally into contact with the uniformly thick wall of adhesive on the tool. The combination of parallelism between the angled fiber tip and the uniformly thick wall of adhesive ensures that a small uniformly shaped cap of the adhesive will be formed on the fiber end. The cap is also so shaped that it is essentially confined to the core tip, with the least amount to the sidewall behind the tip. This ensures a gradual taper to the chip without a bridge to any adjacent fibers. After all attachments between other fibers and waveguides have been completed, further adhesive, of different composition and better fixing qualities than those of the first mentioned adhesive, is secured to all neighboring attachments to provide a more permanent, strain relief connection between the fibers and the chip.

These operations relating to the tool are preferably performed by use of a service robot, while those relating to movement of the fiber are preferably performed by use of an alignment robot. Both robots are driven by appropriate computer software.

ADVANTAGES OF THE PRESENT INVENTION

Several advantages are derived from the above described methods and apparatus. In general, the number of attachments between optical waveguides is minimized, thereby lessening attenuation of signals. Alignment between the cores of waveguides to be attached together can be made expeditiously and without undue delay before the adhesive hardens, yet avoiding the above discussed problems relating to too rapidly made attachments. The need for skilled labor, along with the attendant costs in training and replacement is reduced and, furthermore, if the skills involved constitute more an art than a skill, the call for such talent is avoided.

Position Maintaining and Transfer Optical Fiber Clamp

The cladded core is tangentially supported along three surfaces comprising those provided by the precision pins and the resilient pad. The larger arced pins permit facile manual loading of the cladded core into a pair of tangential contacts with the more finely defined groove of the smaller arced pins and avoids the problems caused by the sharp corners found in V-grooves and machined slots. The cladded core can be held in an oriented position. The precision alignment plate is relatively easy to fabricate and assemble compared to other commercially available designs. The assembled clamp is self contained and, therefore, can be left in place and moved from station to station while always maintaining axial and angular position of the core. This axial and rotational support of the cladded core allows it to be directly transferred to mating assemblies while not disturbing its cleaved polarization maintaining position or without needing any coarse alignment steps for the freely extending portion of the cladded core or further polarization maintaining rotation.

Vacuum Holder for Optical Fibers

Vacuum leakage and resulting fiber vibration are effectively eliminated. The costs in maintaining and producing perfect alignment between the fiber and the vacuum channel are minimized as compared to present vacuum chucks.

Goniometer Mapping and Positioning of an Optical Fiber with Respect to a Waveguide Considerable time is saved in that the goniometer rotates and realigns the fiber core to the center of alignment in real time, without any additional time being associated with centering or realigning the fiber.

Initial Launching of Light Between an Optical Fiber and a Waveguide

Optical fibers can be joined to waveguides having core and waveguide diameters of 6 microns. Such joining is not difficult to implement, and is accomplished with relative ease and at low expensive relative to the prior art camera and lens. It can be easily designed into a system, and consumes little space.

Planar Alignment of Optical Fibers to Optical Waveguides

Primarily, the maximum power to position data is quickly and accurately obtained.

Angular Position Alignment of an Optical Fiber with Respect to a Waveguide

Optical rotational alignment extinction ratios of at least −40 dB are achievable in an accurate and in a minimum time. Rotational alignments of fibers with relative low and high extinction ratios are equally achievable with the same accuracy in approximately the same amount of time.

Establishing a Gap Between an Optical Fiber and a Waveguide

Linear movement along the optical path allows accurate determination of the position of the end of the waveguide vis-a-vis the fiber tip. Data accumulation is obtained in real time, so that the fiber movement is stopped immediately upon contact, and thereby reduces the amount of displacement and potential deformation of the fiber. Control of the fiber gap to approximately 0.1 micron is obtainable, resulting in enhanced fiber end quality. Potential damage to the cleaved fiber end is minimized.

Attaching Optical Waveguides Together

The number of attachments between optical waveguides is minimized, thereby lessening attenuation of signals. Alignment between the cores of waveguides to be attached together can be made expeditiously and without undue delay before the adhesive hardens, yet avoiding the above discussed problems relating to too rapidly made attachments. Contact of adhesives between neighboring attachments of several waveguides through the enforced provision of a gap is avoided, thereby avoiding stresses on and degradation of the fibers and the bond. The need for skilled labor, along with the attendant costs in training and replacement is reduced and, furthermore, if the skills involved constitute more an art than a skill, the call for such talent is avoided.

Other aims and advantages, as well as a more complete understanding of the present invention, will appear from the following explanation of exemplary embodiments and the accompanying drawings thereof.

Figure 2:
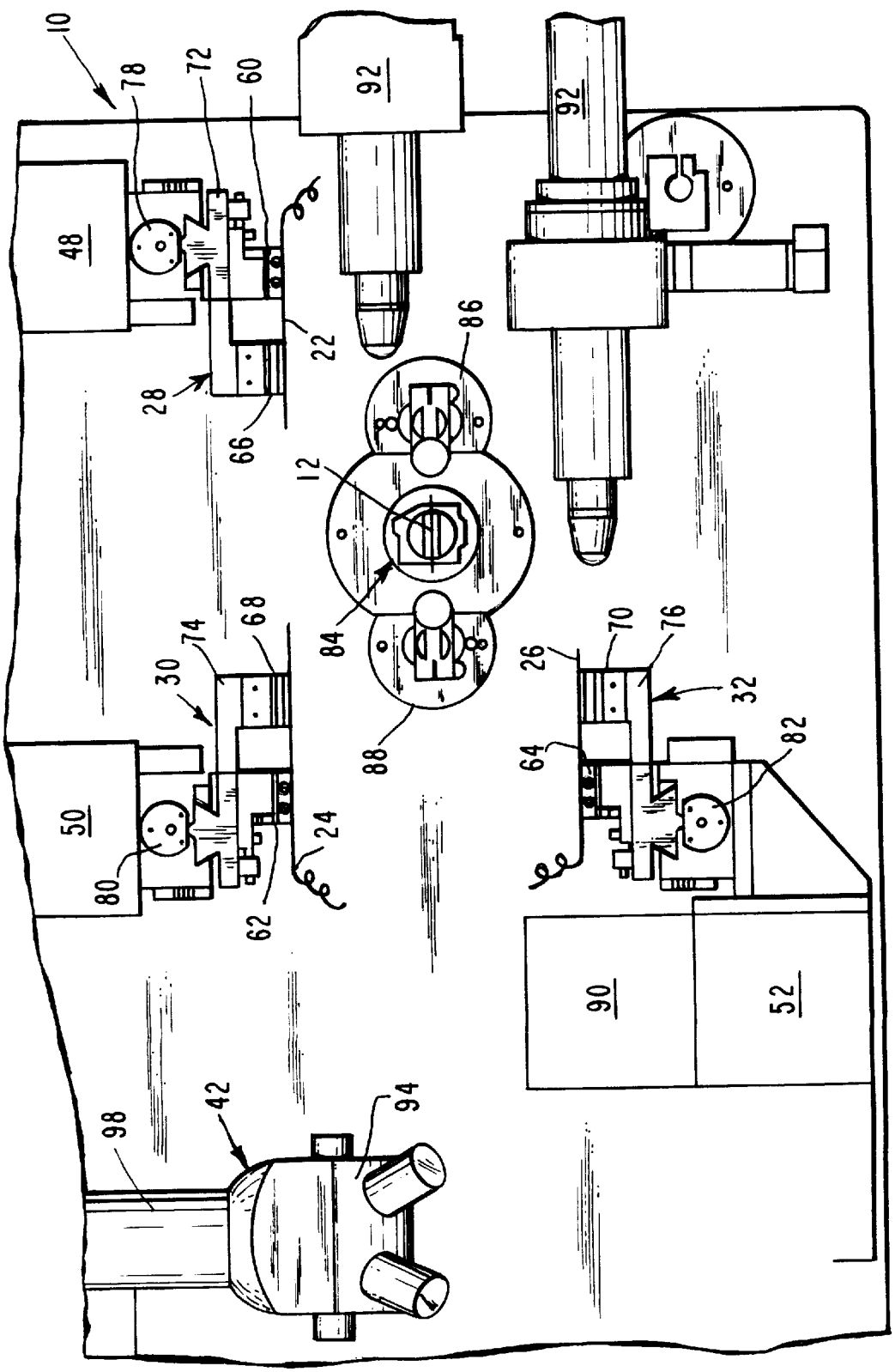
FIG. 2 (to which numerals 10–99 are applied) is a plan of the preferred embodiment showing (a) a holder assembly for precisely supporting an integrated optic chip (IOC) and its included waveguides, and (b) service and alignment robots for performing their respective tasks relating to alignment and attachment of optical fibers to the integrated optic chip waveguides in the IOC holder assembly, in which the alignment robot and its three optical fiber holding assemblies, that include the FIGS. 4–9 position maintaining and transfer optical fiber clamp and the FIGS. 11–13 vacuum holder, and respectively support an input optical fiber and two output fibers for alignment with their respective IOC waveguides.
Figure 3:
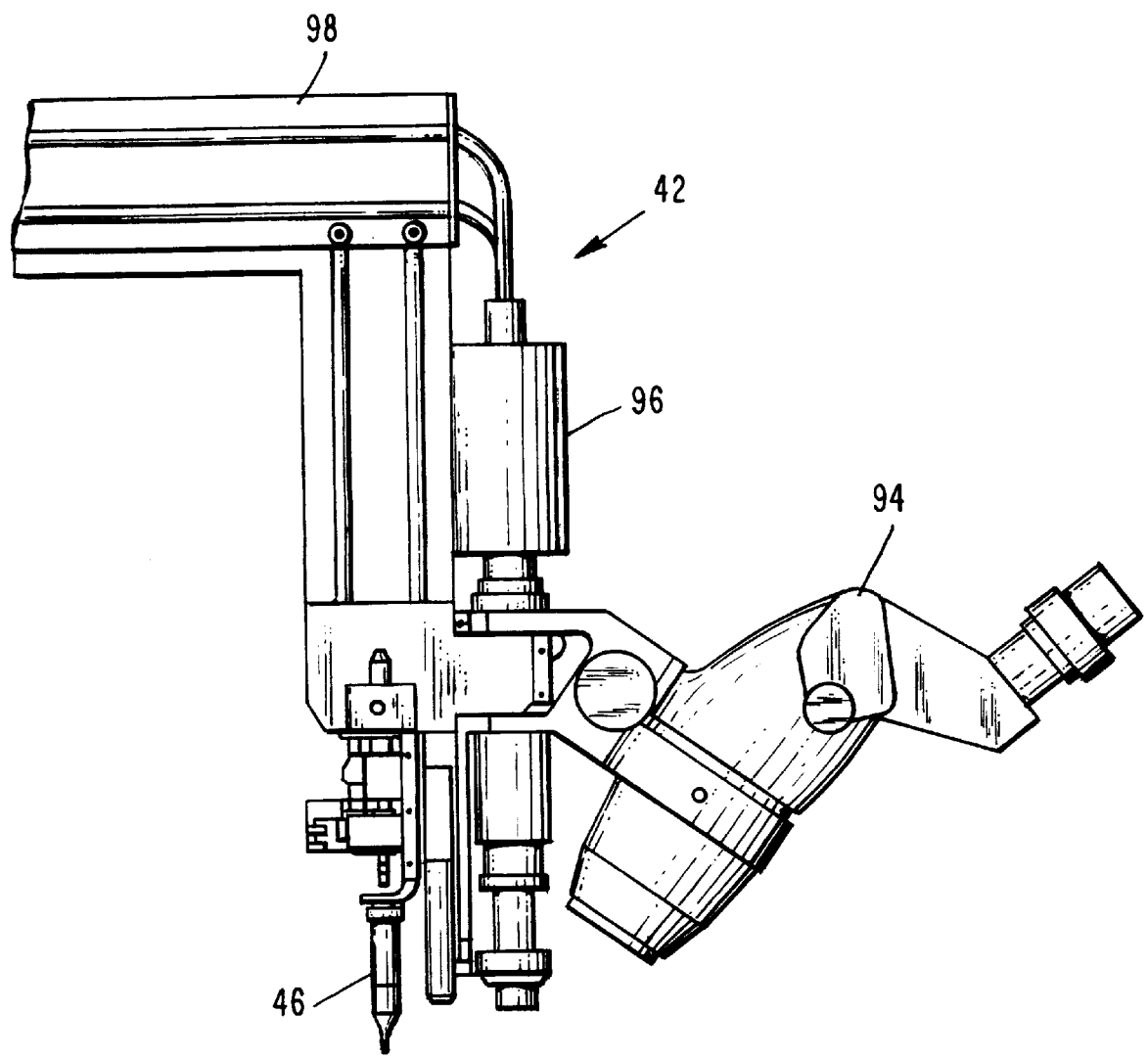
FIG. 3 (to which numerals 10–99 are applied) is a view of a portion of the plan depicted in FIG. 2 showing the arm of its service robot, including the service tool holding assembly for such tools as adhesive applying implementation, a vacuum pick-up mechanism and viewing apparatus.
Figure 20:
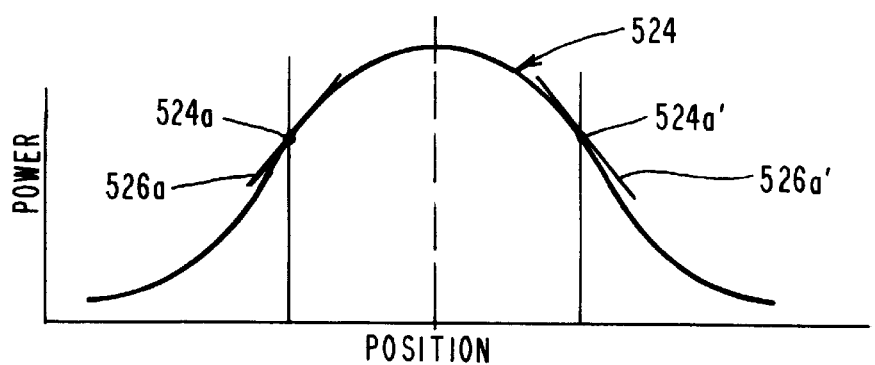
Figure 21:
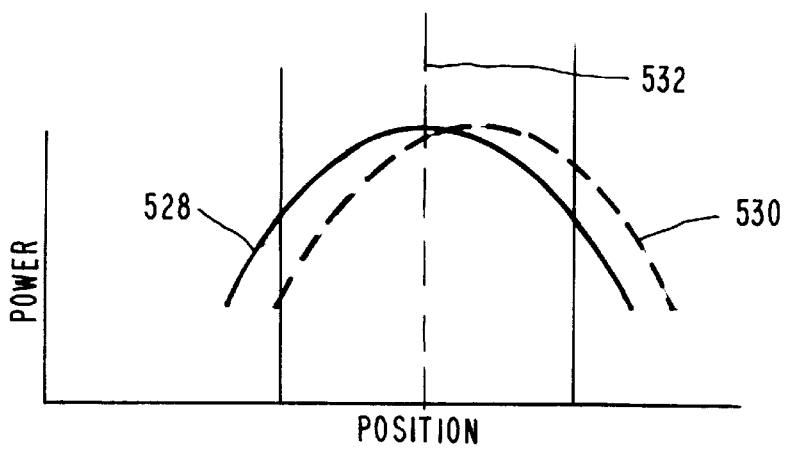
Figure 19:
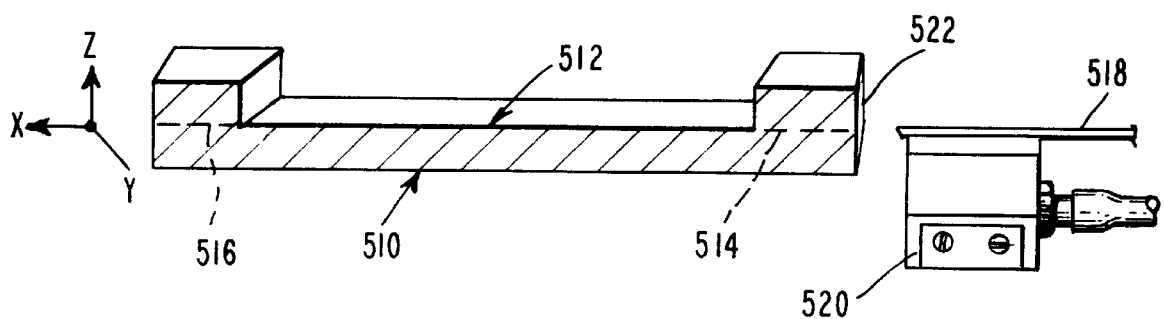
Figure 22:
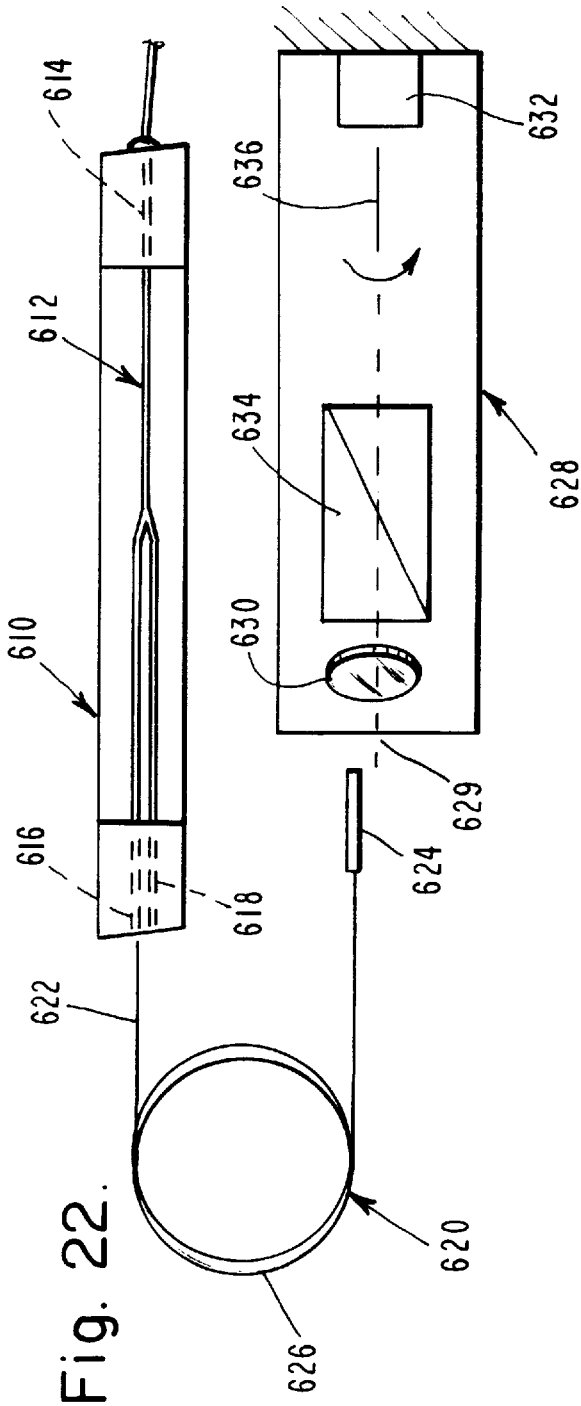
Figure 23:
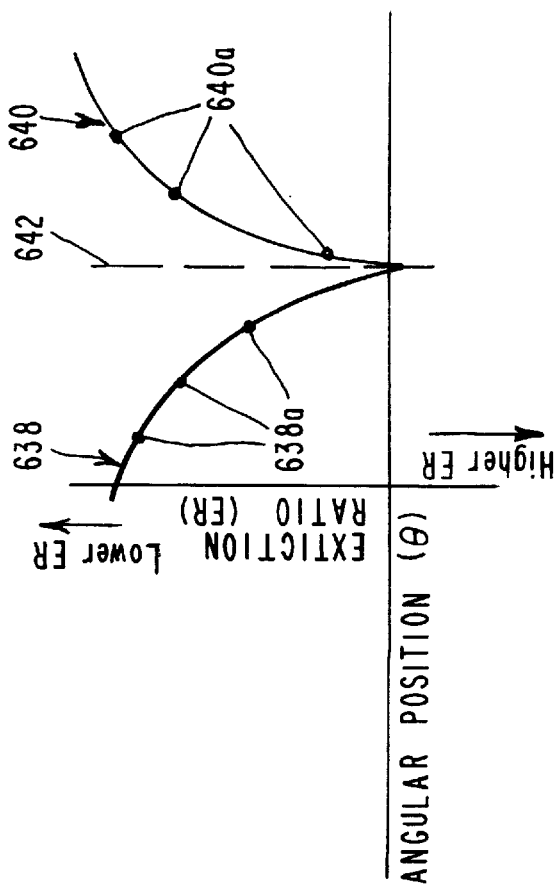
Figure 24:
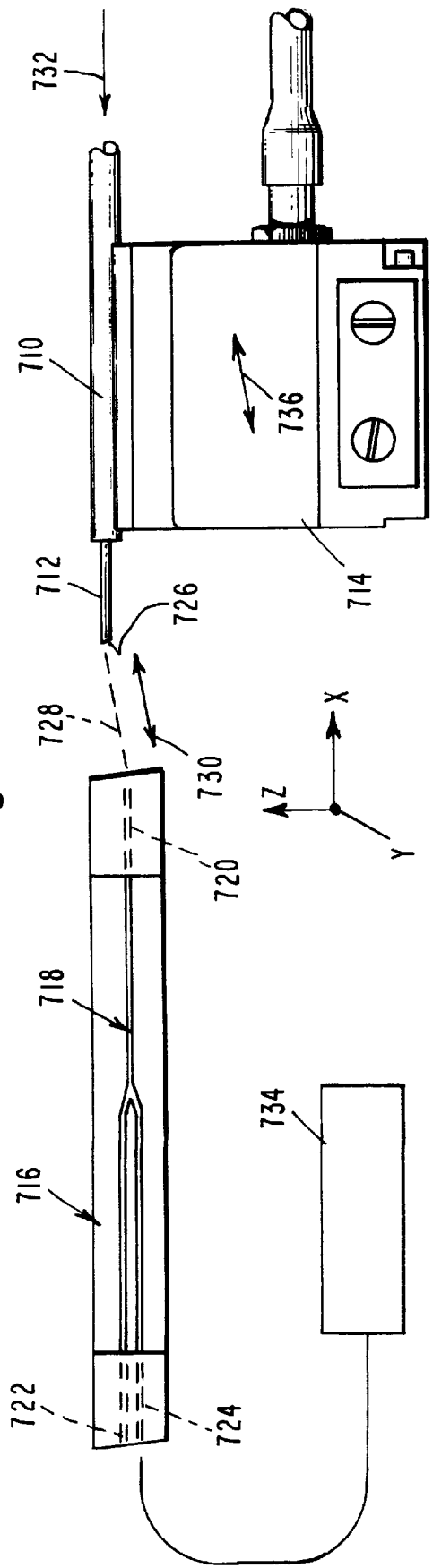
Figure 25:
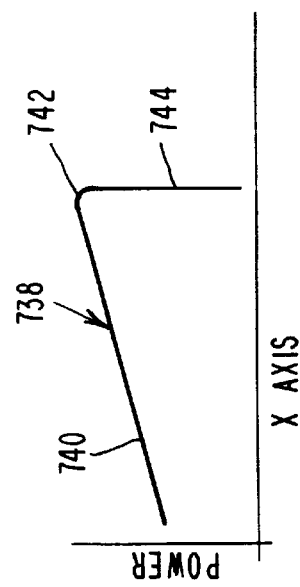

functioning in its cladding mode for initial light launching, and in which the input fiber is held in the vacuum chuck of one of the vacuum holders and the cladding mode optical fiber is held in a V-groove in the other of the vacuum holders;

FIGS. 19–21 (to which numerals 500–599 are applied) show an enlarged view of the integrated optical chip and its waveguides, exhibitive portions of the vacuum holders illustrated in FIGS. 10–13, and a pair of curves depicting power as a function of the position of an optical fiber, for planar position alignment of the input and output fibers with respect to their IOC waveguide legs in the integrated optic chip;

FIGS. 22 and 23 (to which numerals 600–699 are applied) are views of the integrated optical chip and its waveguides and associated polarization apparatus which is exhibitive of portions of the optical fiber holding assemblies illustrated in FIGS. 2 and 3, and a curve depicting extinction ratio as a function of the angular position ($\ominus$) of an optical fiber;

FIGS. 24 and 25 (to which numerals 700–799 are applied) depict an enlarged view of the integrated optical chip and its input waveguide, an exhibitive portion of the vacuum holder shown in FIGS. 10–13, and a curve depicting power as a function of x-axis position of an optical fiber, for determining the gap between the end of the fiber and its associated waveguide; and FIGS. 26–35 (to which numerals 800–899 are applied) are views of apparatus for attaching optical waveguides together which, in the preferred embodiment, comprise the input and output optical fibers to their respective IOC waveguides, and the provision of gaps between fiber-to-fiber bonds for preventing stresses on adjacent fibers and their bonds.

DETAILED DESCRIPTION OF THE PREFERRED EMBODIMENTS

As a preliminary consideration, it is important that the x, y, z axes and $\ominus$ rotational alignment and positional information obtained by use of the present invention be stable and not vary which, in turn, is dependent upon the ability of the instruments to provide information that does not wander over a period of time. This wandering is often caused by improperly placed physical attachments and/or restraints associated with the supporting table and other physical structures employed by the practitioner of the present invention, and by thermal incompatibility among the hardware and components. Therefore, it may be necessary to adjust and reposition the bolting or other attaching means, for example, and to use materials having different coefficients of thermal conductivity and expansion to achieve the necessary control and the needed stability.

Figure 1:
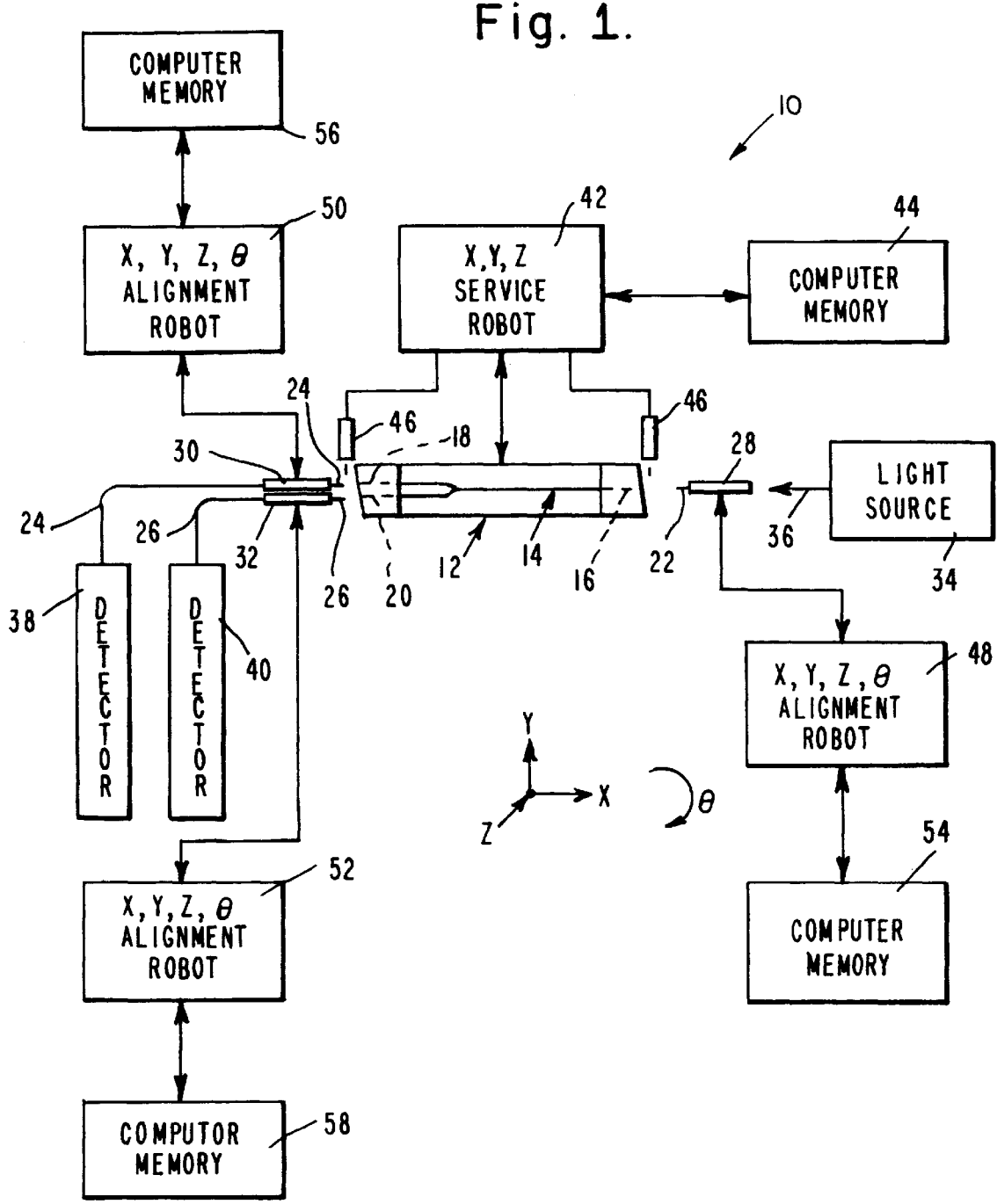
FIG. 1 (to which numerals 10–99 are applied) is a block diagram of a preferred embodiment of the present invention.

FIGS. 1–3 show a system 10 for aligning and attaching optical fibers to optical waveguides, specifically, waveguides in an integrated optic chip (IOC) although, as previously stated, the alignments and attachments have broader application. Such applications, by way of example, include the following attachments: fiber to fiber regardless of core sizes and taper, fiber to detectors by monitoring detector response, fiber to emitters, fiber to couplers including evanescent field butted or lapped of biconical fused, and optimizing throughput to an optical fiber or receiver.

Accordingly, an integrated optic chip 12 includes a waveguide 14 having an input leg 16 and a pair of output legs 18 and 20. While waveguide 14 may include only a single output leg or more than two legs, for purposes of describing the preferred embodiment of the present invention, the following exposition will be restricted to two output legs.

The optical couplings to the waveguide legs include an input optical fiber 22 positioned adjacent waveguide input leg 16, and a pair of output optical fibers 24 and 26 respectively positioned adjacent waveguide output legs 18 and 20. The cladded cores of fibers 22, 24 and 26 are securely held respectively in clamp/holders 28, 30 and 32. A source of light 34 directs light into fiber 22, as denoted by arrow 36. Light outputted from output optical fibers 24 and 26 is directed respectively to detectors 38 and 40, although a single detector can be employed.

A service robot 42, to which a computer memory 44 is connected, is coupled to chip 12 for determining and storing the position of the chip and, in particular, the termini of its waveguide legs 16, 18 and 20. Among other duties, service robot 42 includes a tool holding assembly 46 (see FIG. 3) for holding such tools as adhesive dispensers, for example, a stick and syringes. Optical fiber clamp/holders 28, 30 and 32 are respectively coupled to alignment robots 48, 50 and 52 which, in turn, are connected to their respective computer memories 54, 56 and 58. If desired, separate alignment robots 48, 50 and 52 and their memories 54, 56 and 58 may be combined into a single robot with a single memory. Service robot 42 is mechanized for providing orthogonal movements about the x, y and z axes of system 10. Alignment robots 48, 50 and 52 are mechanized for providing orthogonal movements about the x, y and z axes and rotational or angular movements $\ominus$ about the x-axis.

Referring now to FIG. 2, optical fiber clamp/holders 28, 30 and 32 respectively include position maintaining and transfer optical fiber clamps 60, 62 and 64 and optical fiber vacuum holders 66, 68 and 70. The three clamps and holders are held stationary in their respective supports 72, 74 and 76 which, in turn, are pivotally mounted respectively on their goniometers 78, 80 and 82. Integrated optical chip 12 is held at a central work station 84 in a suitable retainer. Positioned on either side of central work station 84 are a pair of side work stations 86 and 88 where operations on chip 12 and alignment and attachment operations are performed to align and attach the optical fibers to waveguide 14. Specifically, operations between input optic fiber 22 and input waveguide leg 16 are conducted at side work station 86, while operations between output optic fibers 24 and 26 and their respective output waveguide legs 18 and 20 are conducted alternately at side work station 88. In addition, side work stations include implements used in aiding rotation of the fibers. Polarization and calibration procedures are performed at assembly 90, while polarization procedures only are performed at assemblies 92; however, it is to be understood that these procedures may be applied wherever and at any position at the discretion of the operator.

An operator may monitor any of the several operations performed by viewing them through a microscope 94 (see FIGS. 2 and 3) or through a video camera 96 (see FIG. 3), both of which are secured to an arm 98 on service robot 42. Video camera 96 is also useful for recording purposes.

Position Maintaining and Transfer Optical Fiber Clamp

Figure 4:
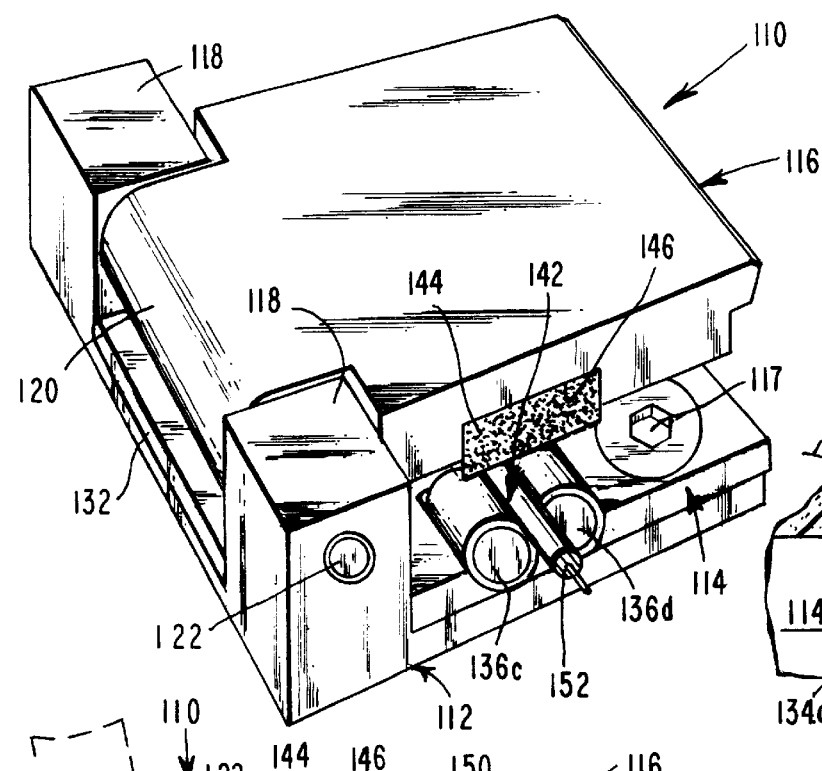
FIGS. 4–9 (to which numerals 100–199 are applied) illustrate a position maintaining and transfer optical fiber clamp, which is a component of all of the optical fiber holding assemblies illustrated in FIG. 2, which, prior to its inclusion in the FIG. 2 alignment robot, is used as a holding fixture for the optical fiber when its tip is cleaved and which, after cleaving, is used to securely hold the optical fiber and its tip in the FIG. 2 alignment robot.
Figure 6:
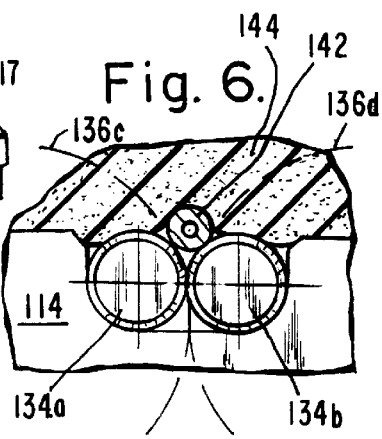
Figure 5:
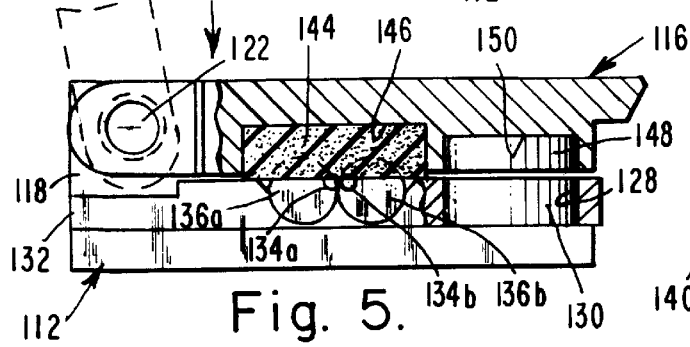

Referring to FIGS. 4–9, a position maintaining and transfer optical fiber clamp 110 for an optical fiber cladded core 142. Clamp 110 includes a base plate 112, a precision alignment plate 114, and a cover plate 116. Alignment plate 114 is secured to the base plate by any suitable means, such as screws 117, one of which is shown in FIG. 4. Base plate 112 is provided with a pair of mating upstanding pivot members 118 and cover plate 116 is provided with an ear 120 which is positioned between pivot members 118 and joined thereto by a pair of pivot screws 122, to hinge cover plate 116 to base plate 112. FIGS. 4 and 5 illustrate cover plate 116 hinged in its contacting position atop alignment plate 114. FIG. 5 also shows the cover plate in phantom or dashed lines, when hinged away from and exposing the upper surface of the alignment plate.

Figure 8:
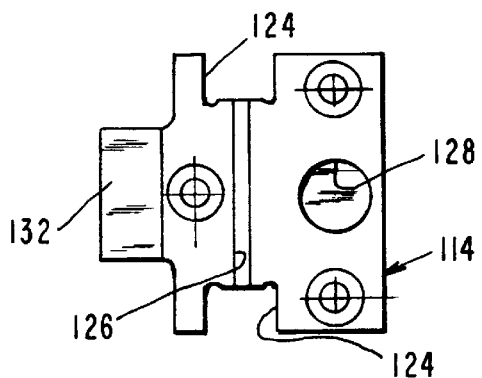

Alignment plate 114, as shown in FIG. 8, includes a pair of side inlets 124 joined together by a channel 126. A circular depression 128 is formed in the forward portion of the alignment plate for reception of a similarly shaped permanent magnet 130 (see FIG. 5). An ear 132 in the back side of the alignment plate is disposed to lie atop base plate 112 between upstanding members 118 and under ear 120 of cover plate 116.

Figure 7:
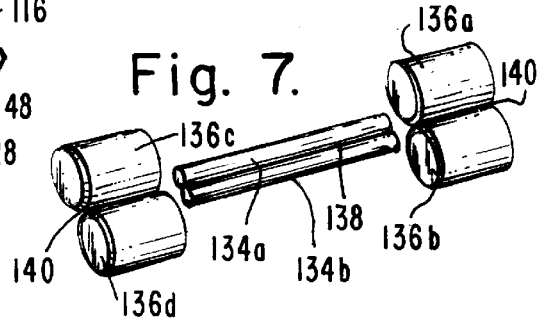
Figure 9:
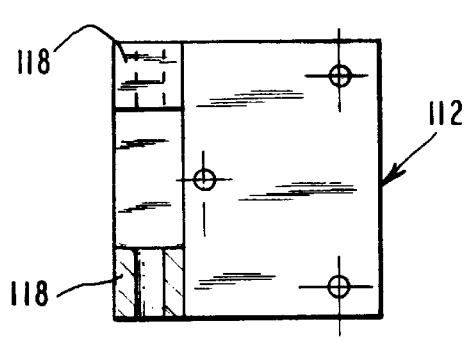

A pair of precision alignment pins 134a and 134b are placed within and supported by channel 126, and two pairs of prealignment pins 136a, 136b and 136c, 136d are housed within opposed side inlets 124 at the respective ends of the alignment pins. The relative dispositions of the alignment and prealignment pins are best shown in FIG. 7, and form a groove 138 between alignment pins 134a and 134b and two grooves 140 respectively between prealignment pins 136a and 136b and pins 136c and 136d. Prealignment pin pairs 136a, 136b and 136c, 136d have larger diameters than those of alignment pins 134a and 134b so that grooves 140 are larger and deeper than grooves 138. This difference between the sizes of the two grooves is an important feature of the present invention when optical fiber cladded core 142 is placed within clamp 110.

A resilient pressure pad 144 is held within a recess 146 in cover plate 116, and a permanent magnet 148 is held within another recess 150 in the cover plate. Permanent magnets 130 and 148 in respective alignment plate 114 and cover plate 116 are in latchable alignment with each other.

The purpose of the precision alignment plate is to define the location of both the prealignment and final alignment pins as well as the y, z axis location of fiber core 142 to an external reference point. Thus, the alignment plate aligns all six pins, the lower magnet and extends out past the base plate and cover to provide the precision alignment surfaces which mate with other holding devices.

The base plate, in turn, supports the alignment plate, creates a plane for vertically locating the four prealignment pins and provides the lugs or pivot members for the cover pivot screws.

In operation, cladded core 142 of the stripped fiber is lowered into the tangential notches of grooves 140 created by the four prealignment pins, that is, between pins 136a and 136b and between pins 136c and 136d. This larger notch guides cladded core 142 into the smaller notch of groove 138 created by the two precision alignment pins but does not control the final position of the fiber. A portion 152 of cladded core 142 extending beyond prealignment pin pair 136c and 136d is called a "stickout" and, at an appropriate part of fiber handling, is cleaved.

After cladded core 142 is in position, resting on the two precision pins, hinged clamp cover plate 116 is pivoted into place to capture and retain the cladded core in both rotation and stickout due to the elastomer forcing the core against alignment pins 134a and 134b. The prealignment pins on each side of the clamp aid the manual insertion of the stripped fiber, and the final alignment pins define the axial orientation and stickout of the fiber after clamping.

Optical Fiber Vacuum Holder

Figure 10:
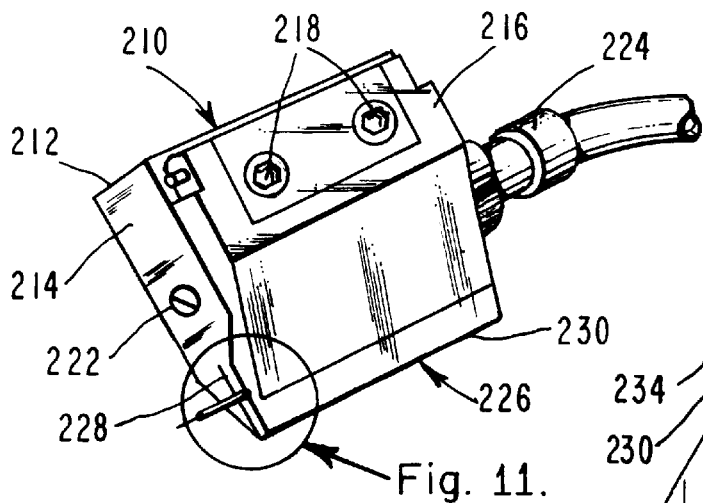
FIGS. 10–13 (to which numerals 200–299 are applied) depict a vacuum holder, which is a component of all of the optical fiber holding assemblies illustrated in FIG. 2, for securely holding an optical fiber during the alignment and attachment of the respective optical fiber to its integrated optic chip waveguide.

As shown in FIG. 10, a vacuum holder 210 includes a housing 212 comprising a main body 214 and a clamping attachment 216 which is bolted or otherwise secured by machine screws 218 to main body 214.

Figure 11:
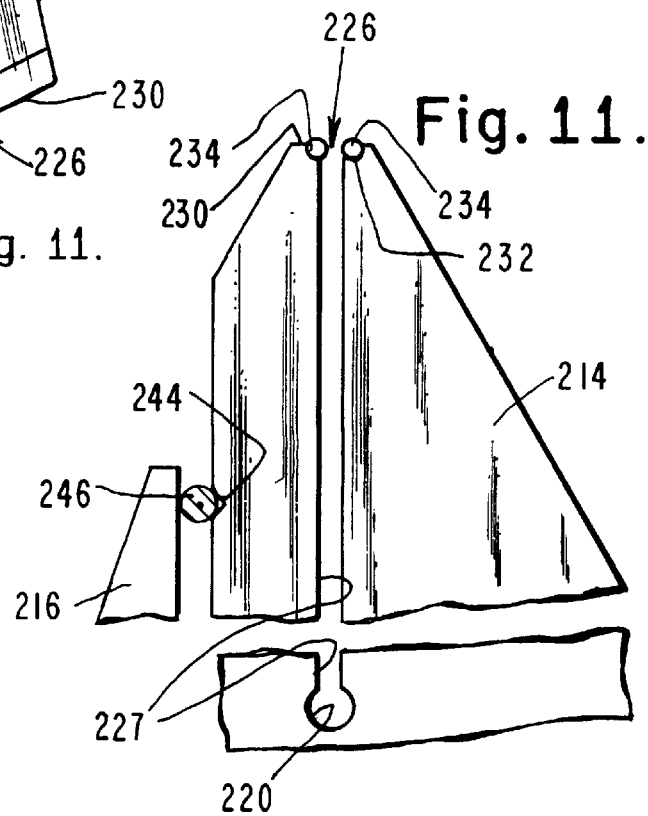

As shown also in FIG. 11, main body 214 includes a through bore 220 which is sealed at one end by a plug 222 and is attached to a vacuum hose and fitting 224 at its other end. Main body 214 also includes a channel opening 226 which communicates through a channel 227 fully with through bore 220. Channel 227 is sealed at both sides by seals 228, one of which is shown in FIG. 10. Accordingly, vacuum holder 210 is sealed at all of its surfaces except for its front surface 230 so that, when air is drawn through vacuum hose and fitting 224 by a suitable vacuum source, air can flow solely through channel opening 226 in front surface 230.

Figure 12:
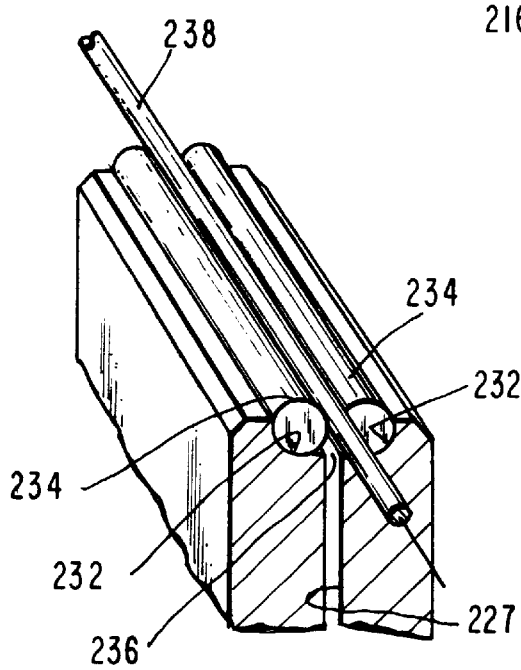
Figure 13:
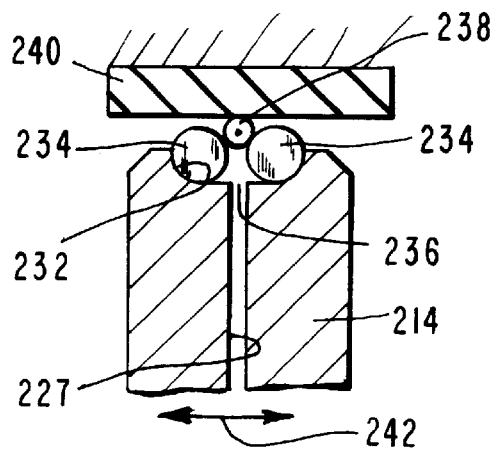

As best shown in FIGS. 11–13, channel opening 226 comprises a U-shaped bed 232 which is bifurcated by channel 227. A pair of gage pins 234 are bonded or otherwise secured to bifurcated bed 232. Gage pins 234 are formed of a hard material whose surface is highly polished and is perfectly straight and round. It is preferred that the finish of the gage pins be as smooth as possible so as not to damage an optical fiber 238. The base material of pins 234 may be of any suitable material, such as of hardened steel. Gage pins 234 are separated from one another to provide an elongated slot 236 for reception of optical fiber 238. The separation provided by slot 236, however, is smaller than the diameter of any fiber 238 which may be placed on gage pins 234. This spacing between gage pins 234 and the diameter, for example, 200 microns, of optical fiber 238 provides an approximate angular contact between the optical fiber and the gage pins of approximately 120°.

When optical fiber 238 is placed on gage pins 234, a vacuum exerted through channel 227 will securely hold the optical fiber on vacuum holder 210. Through experimentation, a vacuum of 28.5 inches of mercury at sea level has been found to be suitable, while pressures below 27 inches of mercury have not provided the desired holding force. However, it is to be understood that proper holding forces depend upon the surface finish of the optical fiber and the space between gage pins 234; therefore, these pressures are given by way of illustration only and are not intended to be limiting.

In the use of the holder of the present invention, for purposes of aligning optical fiber 238 with another optical waveguide, it is sometimes necessary to rotate the optical fiber. For this purpose, as shown in FIG. 13, a fixed elastomeric pad 240, is selected to have a characteristic which is sufficient as to provide a friction that is essentially absent with respect to gage pins 234. Vacuum holder 210 with optical fiber 238 affixed thereto by a vacuum, is brought up against pad 240 and to bring the optical fiber into contact with the elastomeric pad. Motion of holder 210 in the direction of arrows 242 permits fiber 238 to be rotated by elastomeric pad 240 on the highly polished surfaces of gage pins 234. Contact of fiber 238 against pad 240 is approximately 120°with respect to its contact with gage pins 234.

Referring again to FIG. 11, a V-groove 244 extends parallel to pins 234 across the nose of main body 214. A further optical fiber 246 is firmly held in the V-groove by clamping attachment 216. Optical fiber 246 is used in its cladding mode for the purpose of initial light launching of an optical fiber to a waveguide, as disclosed herein with respect to that part of the present invention discussed with respect to FIGS. 17 and 18.

Goniometer Mapping and Positioning

In order that a goniometer accurately measure angles between the waveguides, such as an optical fiber with respect to a waveguide in an integrated optic chip, it is necessary to know exactly the position of the optical fiber. Therefore, the positioning of the optical fiber with respect to the goniometer and the structure, on which the goniometer and the chip are placed, must be first determined.

Figure 14:
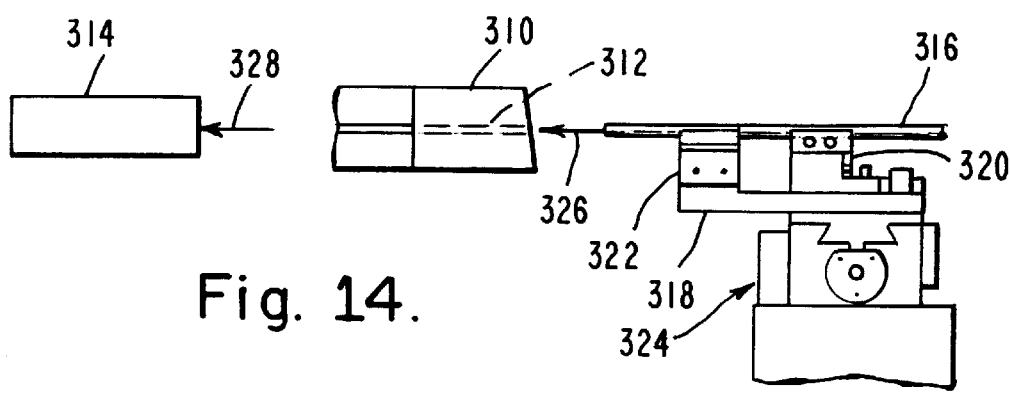

Accordingly, with reference to FIG. 14, an integrated optical chip (IOC), as represented by an input end portion 310 thereof and an input leg 312 of its component optical waveguide, is positioned adjacent to a detector 314 at the output end of waveguide leg 312. An optical fiber, which is represented by its core 316, is suitably held within a clamp/holder assembly 318, such as a clamp 320 and a holder 322. Clamp 320 may comprise position maintaining and transfer optical fiber clamp 210 described herein in FIGS. 6–9, and vacuum holder 322 may comprise vacuum holder 210 described herein in FIGS. 10–13.

Clamp/holder assembly 318 is secured to a goniometer 324 of conventional construction, such as produced by Newport Corporation, and described in their publication entitled "The 1994 Newport Catalog" on pages 6, 16 through 6, 18. Input light, as designated by arrow 326, from a suitable source of light radiation, is transmitted from core 316 into and through waveguide 312, and thence as an output, as designated by arrow 328, to detector 314.

Figure 15:
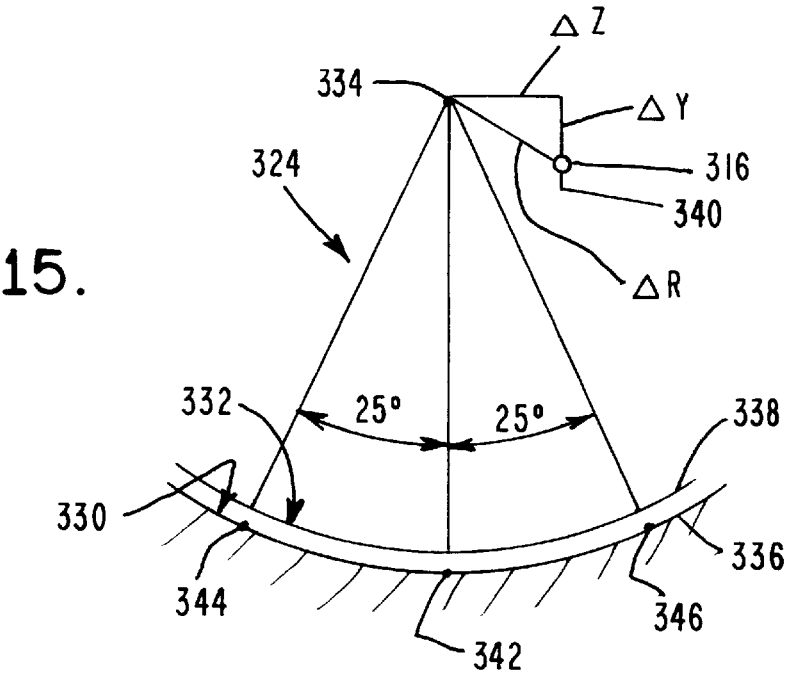
FIGS. 14–16 (to which numerals 300–399 are applied) are schematic views of an integrated optical chip and a goniometer supported optical fiber generally aligned with a waveguide in the chip, which is a component of all of the optical fiber holding assemblies illustrated in FIG. 2, a view to represent the goniometer and fiber movements, and a graph depicting movements of the goniometer and the optical fiber supported thereby.

FIG. 15 represents an angular disposition obtainable by means of goniometer 324, which includes a member 330 which is affixed to the ground apparatus and a moveable member 332 which is angularly moveable about an axis 334. Members 330 and 332 include closely spaced surfaces 336 and 338 which comprise arcs of circles having common centers on axis 334.

FIG. 15 also shows optical fiber core 316 at a position 340. The separation between goniometer axis 334 and position 340 of core 316 are spaced from one another by a distance of ΔR. While this distance ΔR is very small, generally about a few microns, it is sufficiently great as to create significant misalignment when the optical fiber is aligned with a mating waveguide, such as waveguide leg 312. Therefore, it is necessary to measure this distance ΔR in terms of its coordinates, Δy and Δz, as determined by the well known equation $$\Delta R^2 = \sqrt{\Delta y^2 + \Delta z^2}.$$

If the axis of core 316 of the fiber at position 340 precisely coincides with axis 334 of goniometer 324 and if goniometer arc surfaces 336 and 338 were perfectly circularly curved, there would be no distance ΔR. In practice, however, goniometer arc surfaces 336 and 338 are not perfect, and it is very likely that optical fiber core 316 is not positioned precisely at the pivot point or axis 334 of the goniometer. Therefore, it is necessary to determine what this off axis distance ΔR is and to input this distance into the computer memory for an alignment apparatus, such as an alignment robot.

Figure 16:
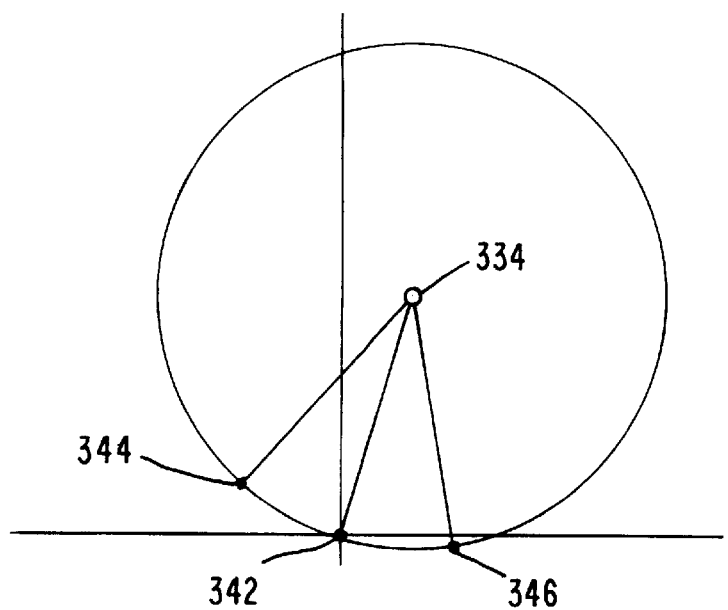

Accordingly, goniometer 324 is moved from a center point 342 to the extent of its travel, approximately 25°, to the end of its travel at points 344 and 346. This travel distance is measured and plotted as shown in FIG. 16. Specifically, optical fiber core 316 is moved along the y and z axes to a known maximum aligned position, through launching. Goniometer member 332 is then rotated to rotate fiber core 316 to a predetermined angular resolution needed for the application under consideration, for example, ¼° for whatever angle is desired. The entire goniometer 324 is then moved to realign the y and z axis to the maximum resolution, e.g., 0.1 micron, of the y and z axes of the optical fiber, if this 0.1 micron is the maximum resolution of the known aligned position. The offsets Δy and Δz, are then determined and stored in the calibration table for the alignment robot, which combines angle, y offset and z offset information. This process is done at every increment of angular resolution for maximum travel of goniometer 324, or ±25° from maximum positions 344 to 346 of the goniometer.

In the use of goniometer 324, to move to any desired angular position, the y and z offsets are obtained from the calibration table for that angle. Simultaneously, the goniometer and its supported optical fiber are moved from a zero position or that position plus any angle from which the core is displaced, to that angle by the goniometer, and the y and z stages under the goniometer are moved to that offset as determined by the calibration table.

These steps may be effected by use of the source code contained in the attached microfiche, specifically routines 390–392 for the calibration mode and routines 588–590 for the usage mode.

The source code for this listing is contained in item numbers 390–392 and 588–590 as set forth in the entire source code contained in the attached microfiche.

Initial Light Launching

Figures 17, 18:
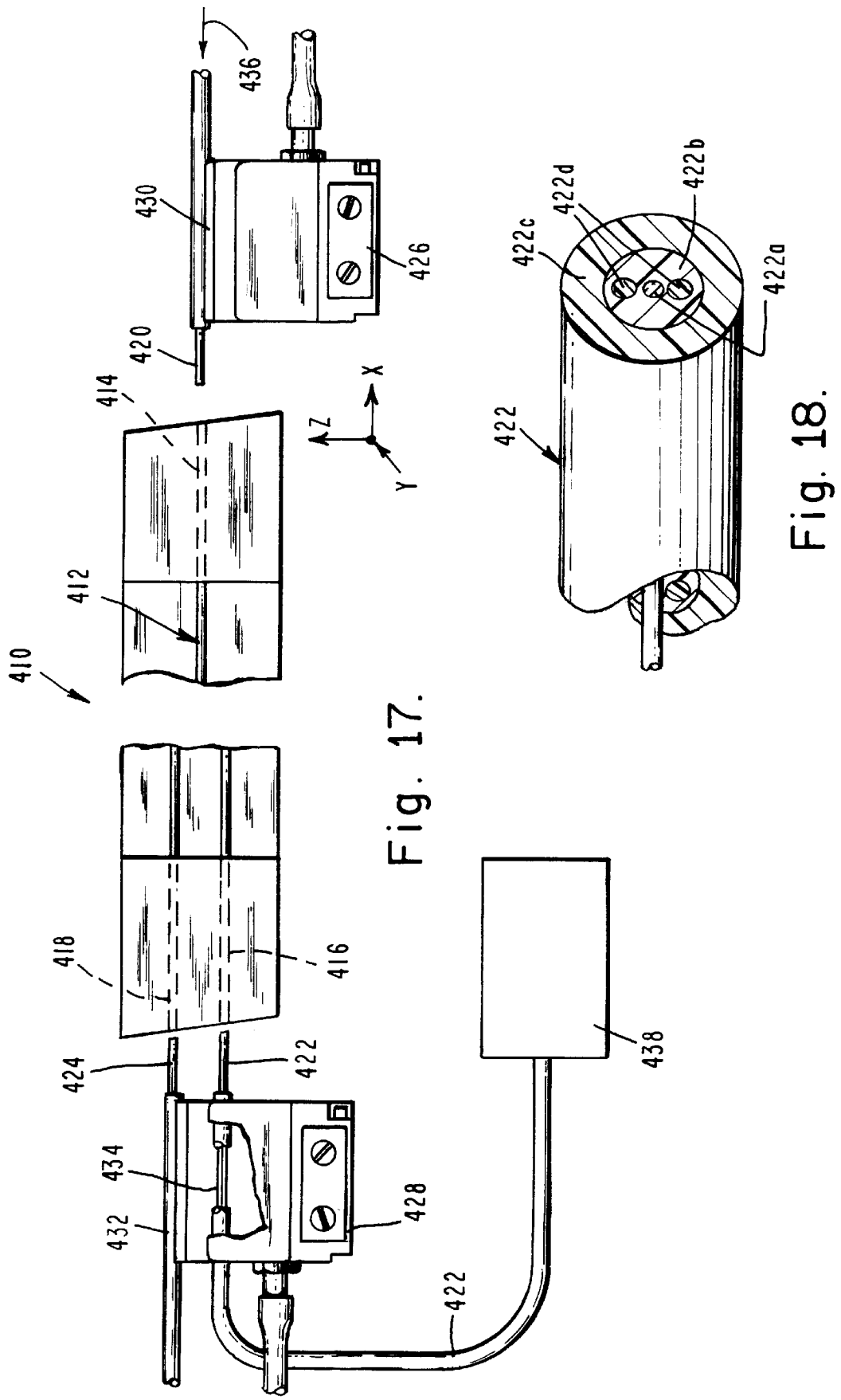
FIGS. 17 and 18 (to which numerals 400–499 are applied) depict the IOC waveguide held between the input optical fiber and another optical fiber (also shown in cross-section)

Accordingly, as illustrated in FIG. 17, an integrated optic chip 410 includes a waveguide 412 with an input leg 414 and a pair of output legs 416 and 418. Chip 410 is positioned between an input optical fiber 420 and output optical fibers 422 and 424. Input optical fiber 420 is positioned adjacent input leg 414 of waveguide 412 and output optic fiber 422 is positioned adjacent output waveguide leg 416. Output optic fiber 424 does not have any present positioning need for purposes of the description relating to FIGS. 17 and 18 hereof.

The fibers are held securely within a holding chuck 426 for fiber 420 and a holding chuck 428 for fibers 422 and 424. Both chucks may be of any desired configuration, but are preferably constructed in accordance with vacuum holder 210 described herein with respect to FIGS. 10–13. Specifically, input optical fiber 420 is held within a vacuum recess 430 of vacuum chuck 426 and output optical fiber 424 is similarly held within vacuum recess 432 of holder 428. Output optical fiber 422, however, is secured within a V-groove 434 of vacuum chuck 428, which V-groove 434 is designated by indicium 244 of FIG. 11.

For purposes of the present invention, optical fiber 422 must be disposed to operate in a cladding mode, that is, its cladding must be able to transmit light. Specifically, as shown in FIG. 18, optical fiber 422 is of conventional construction and includes a core 422a which is supported in a cladding 422b. A jacket 422c surrounds the cladding. Stress members 422d in cladding 422b exert stress on core 422a. Typically, core 422a has a 6 micron diameter, cladding has an 80 micron diameter. While a specific fiber 422 has been described, it is to be understood that other fibers, also of conventional constructions, are as applicable for use as the specific fiber described herein, and may be substituted therefor with equal merit. Cladding 422b in fiber 422 thereby is employed as a funnel for any light emanating from output waveguide leg 416, as will be presently described.

In order for this portion of the present invention to be used, light must be input into fiber 420 from a light source as designated by arrow 436, and light emanating from fiber 422 is directed to a detector 438 in any conventional manner.

In operation, output fiber 422 is placed within approximately 50 microns of waveguide leg 416. Because cladding 422b is 80 microns in diameter, this 50 micron placement is not difficult to achieve. Light is then rastered from input fiber 420 until the light is launched through waveguide 412 at its input leg 414. This rastering permits input fiber 420 to be aligned within 5 microns. Fiber 420 is then more precisely aligned with respect to input waveguide leg 414 to within 0.1 micron using the procedures and apparatus described herein with respect to FIGS. 19–21.

Once input fiber 420 is precisely aligned with respect to input waveguide leg 414, optical fiber 424 is aligned along its y, z and x axes with respect to waveguide output leg 416 by appropriate movement of vacuum chuck 428. Another optical fiber is then aligned along its y, z and x axes with respect to waveguide output leg 418. These alignments are obtainable by any suitable means, such as through the apparatus and procedures described herein with respect to FIGS. 19–21 for y, z axis alignment and FIGS. 24 and 25 for x-axis alignment.

Planar Position Alignment

Referring now to FIG. 19, an integrated optic chip (IOC) 510, which is shown in cross-section, supports an optical waveguide 512. Waveguide 512 includes an input leg 514 and one or more output legs 516. An optical fiber having a cladded core 518 is secured within a holder 520 of any suitable construction; however, vacuum holder 210 of FIG. 10 described herein is preferred. Core 518 is approximately aligned along its y and z axes within ±5 microns to input waveguide 514 by use of any convenient alignment means. Preferably, this y-z alignment utilizes the system previously described in conjunction with FIGS. 17 and 18 herein, using optical fiber 434 operating in a cladding mode.

Next, core 518 is mechanically moved along one of its axes, for example, the y axis, although the z axis is as acceptable. This movement along the y axis is in a plane parallel to the face, identified by indicium 522, of the chip at a speed sufficient to obtain power and position measurements which are shown on a Gaussian-type curve 524, as shown in FIG. 20. By launching light through the core, it is possible to detect light, as represented by the portion on curve 524 lying between a pair of points, such as points 524a and 524a'. The slope at each point, as identified by tangent lines 526a and 526a' at respective points 524a and 524a', is tested and measured as moving in a predetermined direction. From this data, it is possible to know if the fiber and its cladded core 518 is being moved with respect to waveguide leg 514 in a direction which will provide increased light transmission, i.e., more power. These measurements are represented by the slope of curve 524. Scanning proceeds from where the scanning begins to an empirically or theoretically predetermined sign and slope, the empirical or theoretical predetermination being dependent upon the waveguide design. Measurements are taken as movement precedes along the curve. The number of measurements depends upon the speed of movement from points 524a to 524a', and from points 524a' to 524a.

The above described movement of fiber core 518 in the y axis parallel to chip 510 is conducted while optical power output data is acquired at the maximum possible acquisition rate. The data must include optical power with its associated mechanical position and is then curve fit to any suitable curve, which was determined to provide the best results for small fiber displacements and from which the maximum power is calculated. The fiber core is then moved to this point of maximum power output. Because of optical power meter bandwidth limitations, this sweep is then repeated in the opposite direction and the results, as shown by mutually displaced hysteresis curves 528 and 530 depicted in FIG. 21, are averaged to determine the average maximum position, which is illustrated by line 532. This averaging provides a y alignment to within 0.1 micron, while accurately eliminating the hysteresis caused by slow optical meters.

The above steps are repeated in the orthogonal z axis and parallel to the chip to obtain the z alignment to within 0.1 micron.

The software sequence listing of the algorithm useful for carrying out the present invention is as follows:

1. Take and save current position information.
2. Take an optical power meter reading and store it for later reference.
3. Command a move in the appropriate axis in either a positive or a negative direction. (For a move parallel to the end face of the chip a move is made in two axes to maintain the distance between the end of the fiber and the end face of the chip).
4. Query the motor position encoder and wait for the stage to begin moving.
5. Begin a conditional control loop where the current optical power meter reading is compared to that taken at the beginning of the routine in step #2.
6. This initial routine has been done to positively place the fiber relative to the optimum aligned position or the maximum power output position. You now know that the fiber is on one side of the maximum.
7. Repeat step #2–5 moving the fiber in the opposite direction from that done in step 3. Curve fit the resulting data to a second order curve. Determine the position of maximum power. This is the optimally aligned fiber position. Plot the results.
8. Repeat step #7 in the opposite direction and average the resulting position information. This averaging of data in opposing directions is done to compensate for optical power meter bandwidth limitations and to eliminate hysteresis.
9. Move the fiber to this averaged align position. The fiber is now optimally aligned in this axis.
10. Repeat steps 2–9 in the axis perpendicular to that done in the previous steps and parallel to the end face of the chip.
11. The fiber is now optimally aligned in the plane of the chip end face.

The source code for this listing is contained in item numbers 384–389 as set forth in the entire source code contained in the attached microfiche.

Angular Position Alignment

Referring to FIG. 22, an integrated optical chip (IOC) 610, which is shown in cross-section, supports an optical waveguide 612. Waveguide 612 includes an input leg 614 and a pair of output legs 616 and 618. An optical fiber 620 has an input end 622, which is held securely and in alignment with the end of waveguide output leg 616, and an output or fiber optimizing end 624. Fiber 620 has a coiled portion 626 intermediate its ends 622 and 624. Fiber optimizing end 624 is positionable at either a polarizing detector 628 or waveguide leg 618, depending upon the particular procedure step entailed. Polarizing detector 628 includes a lens 630, a detector 632, and a polarizer 634 positioned between lens 630 and detector 632. The polarizer is provided with an adjustable polarization axis 636. Detector 632 is secured to a stationary part of axis 636.

Prior to rotationally aligning the polarization axis of optic fiber 620 to the polarization axis of waveguide leg 618 of integrated optic chip 610, polarizing detector 628 is calibrated with the polarization axis of chip 610 by conventional means, or by use of the present invention.

In this rotational alignment process, that is, the the alignment of the polarization axis of optic fiber 620 to the polarization axis of waveguide leg 618, the extinction ratio of the fiber is used as the maximizing variable.

In operation, optical fiber 620, which is to be rotationally optimized, is secured at its input end 622 in any suitable holder, such as vacuum holder 210 disclosed herein in FIG. 10, and aligned to the output of waveguide output leg 616. Output end 624 of the fiber is placed at polarizing detector 628. The polarization axis of detector 632 is then aligned with the polarization axis of fiber 620. The approximately aligned fiber is moved to waveguide leg 618 and aligned thereto, respectively along the y, z and x axes in accordance with the procedures and mechanisms described herein with respect to FIGS. 19–21 relating to y-axis and z-axis alignment, and FIGS. 24 and 25 relating to the x-axis alignment. The order of alignment is critical.

The extinction ratio of chip waveguide output leg 618 to fiber 620 is measured to obtain a value which is used to determine the step size of the maximization routine. The measurement proceeds in accordance with the following procedure. First, fiber end 624 is rotated in a stepped manner in order to take measurement points to produce curves 638 and 640 as shown in FIG. 23. Specifically, the measurement points are taken every 90° and 0°, or vice-versa, of the polarizer, and plotted equidistantly along the angular position axis as points 638a and 640a, which are fitted into curves 638 and 640. Second, the minimum rotary adjustment is identified by use of a modified Newton-Rafson method to minimize the extinction ratio of the fiber to the chip, specifically by drawing a line 642 intermediate to curves 638 and 640. Third, fiber end 624 is realigned to waveguide leg 618 with each rotational adjustment; this tends to minimize optical noise and increase alignment accuracy.

Through the above described procedure, a fiber with a low extinction ratio, e.g. of −40 dB, can be rotationally aligned with the same accuracy as one with a higher extinction ratio in approximately the same amount of time.

The software sequence listing of the algorithm useful for carrying out the present invention is as follows:
1. The fiber (620) is visually, rotationally aligned using the cleaved angle of the fiber free end (622) as a visual alignment guide.
2. One end (624) of the fiber (hereafter called the "optimizing end" of the fiber) is placed at the input (629) of a polarizing detector (628). The detector has an adjustable polarization axis (636) which has previously been visually approximately aligned with the polarization axis of the IOC chip as part of the station calibration procedure.
3. The other end (622) of the length of fiber is aligned, for example, using the y and z axis alignment routine described herein with respect to FIGS. 19–21, to the output (616) of the optical chip. This is the fiber "free end".
4. The polarization axis (636) of the detector (632) is aligned with the polarization axis of the fiber optimizing end (624). This fiber is then rotated so that the fiber optimizing end (624) is approximately aligned with the chip. This pre-alignment is done to improve the speed of this rotational alignment routine.
5. Some error checking is done here to insure that the rotation required for the fiber does not exceed the capability of the device used to rotate the fiber. If this error condition is detected, then the fiber is moved to a separate realignment routine. One such realignment routine can be effected by use of the procedures described herein with respect to FIGS. 14–16, through realignment of the fiber in goniometer 324.
6. The free end (622) of the fiber is moved to a detector, if desired detector 632, and rotationally aligned to its polarization axis.
7. The approximately aligned optimizing fiber end (624) is now moved to and aligned to the chip at leg 618, for example, using the y and z axis alignment routine described herein with respect to FIGS. 19–21.
8. The fiber to chip gap is set, for example, using the x-axis alignment routine described herein with respect to FIGS. 24 and 25, and the fiber is moved a predetermined distance from the chip to prevent the fiber from contacting the chip during fiber rotation.
9. The extinction ratio of the chip to the fiber is measured. This value is used to determine the step size of the maximization routine. Using this method, a fiber with a low extinction ratio can be rotationally aligned with the same accuracy as one with a higher extinction ratio in approximately the same amount of time. This step size is a critical parameter. Too small a step would produce an unmodelable extinction ratio curve. Too large a step would produce a curve which would not be modelable with a second order model. The relationship between extinction ratio and step size has been determined empirically.
10. The extinction ratio is measured and the fiber rotated in increments of the predetermined step size. After each fiber rotation, the fiber is realigned to the chip at waveguide leg 618 with the YZMAX routine described herein with respect to FIGS. 19–21 to minimize optical power variations and improve accuracy. Thus, for each measurement point 638a used to construct curve 638, it is necessary to use the YZMAX routine and, later, in step 11 to perform the same operation for each measurement point 640a used to construct curve 640.
11. This rotation and measurement is continued in the same direction until a change in slope is detected.
12. Measurements are taken in increments of the step size until three measurements on both sides of the slope change are obtained. Because of the time involved with realigning the fiber after each rotation, measurements are saved and no measurements are retaken at any other rotational position, as a result of conducting the procedures of steps 10 and 11. In other words, if four incremental measurements were taken and stored before the slope change were detected, these measurements would not need to be repeated to obtain the three measurements on both sides of the slope change.
13. The data is curve fit to a second order model and the maximum extinction ratio point predicted.
14. The fiber is rotated to this minimized position.
15. The data is plotted, the fiber at optimized end 624 is realigned to the chip at waveguide leg 618 and the routine is exited.

As an alternate to steps 6–8 described above, any equivalent method may be used, such as the method described by Melles Griot Inc., for example, in their brochure entitled "Nanopositioning Guide Components and Systems for Fiber Optics, Optics, Lasers, Integrated Optics," copyright 1993.

The source code for the above listing is contained in item numbers 395–405 and 408 as set forth in the entire source code contained in the attached microfiche.

Gap Establishment

Accordingly, as shown in FIG. 24, an optical fiber 710 having a cladded core 712 is held within a holder 714, such as the vacuum holder described herein with respect to FIGS. 10–13. An integrated optic chip 716 includes a waveguide having an input leg 720 and a pair of output legs 722 and 724. Fiber core 712 is positioned adjacent to waveguide input leg 720. Optical fiber core 712 is precisely positioned by its holder 714 to waveguide 720. The axis of cladded core 712 is positioned parallel to, but offset from the axis of waveguide leg 720 because cladded core 712 is provided with a cleaved surface 726 which is angled non-perpendicularly with respect to the axis of the cladded core so that, as is known in the art, light will not be reflected back into the core. As a consequence of the angling of cleaved surface 726, light travels along a non-axial path 728 from cladded core 712 to waveguide leg 720.

The position of holder 714 and its retained optical fiber 710 is precisely positioned along the y and z axes, that is, in a plane normal to the axis of waveguide 718, this position having been obtained by use of any y, z axis alignment technique, such as disclosed herein with respect to FIGS. 19–21 or as set forth in a publication by Melles Griot Inc., entitled "Nanopositioning Guide", subtitled "Components and Systems for Fiber Optics, Lasers, Integrated Optics", published 1993. This publication describes that company's automatic fiber alignment technique on pages 7-2 and 7-3. Another y, z axis alignment technique is also described in U.S. Pat. No. 5,278,934.

After this precise positioning, fiber 710 is moved by holder 714 in a path designated by double-headed arrow line 730, which is superimposed with light path 728. Simultaneous with this motion, light from a light source, as depicted by arrow 732, is directed through optical fiber core 712, and the light traveling through waveguide 716 is directed to a detector 734.

The presence of the light moving from surface 726 to waveguide input leg 720 along path 728 and the movement of holder 714 and optical fiber 710 along its x and y axes, as designated by arrow 736, is recorded and displayed such as shown in curve 738 shown in FIG. 25. During initial travel of the optical fiber towards the waveguide, the power to position curve relationship is depicted on curve portion 740 of curve 738. At the point where surface 726 contacts the end of waveguide input leg 720, there is a dramatic discontinuity in power represented by a point 742 on curve 738, with a sudden drop off in power as shown by line 744 of FIG. 25. At this point of contact at point 742, forward motion of holder 714 is stopped. The positioning data of the point vector for movement along the x-axis is stored in a computer memory for future reference, and the optical fiber and its end surface 726 are then moved back away from waveguide input leg 720 and integrated optical chip 716 to a predetermined suitable distance, for example, 15 microns.

The software sequence listing of the algorithm is as follows:
1. Take and save current positional information.
2. Move the fiber back away from chip 716 by 10μ along the beam path, that is, the path which the beam takes as it exits the chip. This may be determined either empirically or analytically. This is important since moving the fiber in and out of the beam path would cause an unmodelable variation in power measured by the fiber.
3. Set the movement rate for the axes utilized to a slow speed (5 μ/sec).
4. Command a move toward the chip and begin a conditional loop. This move should once more be along the beam path.
   4.1 Take an optical power reading, and a positional encoder reading. Save these in an array for subsequent plotting and modeling.
   4.2 Watch for a sharp discontinuity in the optical power output. This indicates that the fiber has contacted the end face of the chip and the fiber has been forced out of the beam path. When this happens exit the loop. (Several other error conditions are also checked during this loop to insure that the fiber is not inadvertently commanded to go too far toward the chip.)
5. After exiting the loop, command the motion controller to halt all motion. Print displacement information for the operator.
6. Move the fiber back, along the beam path, away from the chip a predetermined distance. This is the "fiber to chip gap".

The source code for this listing is contained in item number 393 as set forth in the entire source code contained in the attached microfiche.

Waveguide Attachment

Figure 26:
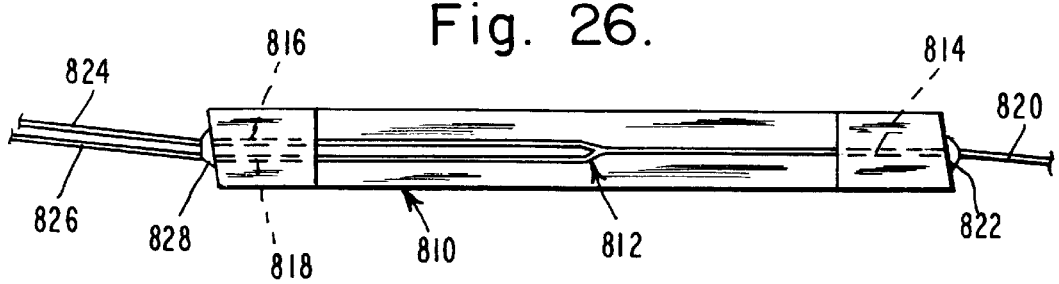
Figure 27:
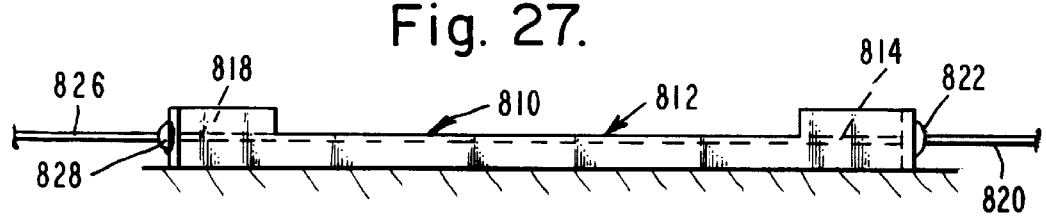

FIGS. 26 and 27 show an integrated optical chip (IOC) 810 having a waveguide 812 which includes an input leg 814 and a pair of output legs 814 and 818. Leg 816 is bonded to an input optical fiber 820 by a composite adhesive bond 822. Legs 816 and 818 are respectively bonded to optical fibers 824 and 826 by a composite adhesive bond 828. The bond between a representative optical fiber and a waveguide leg is produced in accordance with the following description and associated FIGS. 28–35.

Figure 28:
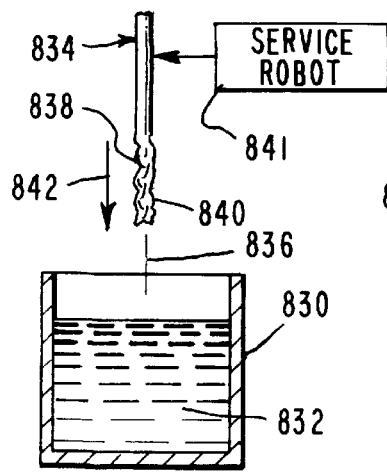

As shown in FIG. 28, a pot 830 contains a supply of adhesive 832, such as a heat curable epoxy resin. Poised above pot 830 is a stick 834 having an axis 836 (see FIGS. 32 and 33) and a circumference 838 whose surface is roughened to provide a rough surface 840. The roughness of the surface is sufficient for allowing a measured amount of adhesive 832 to adhere to the stick, as will be subsequently described. Preferably, stick 834 is secured to a service robot 841 which is used to control all travel and positioning of the stick.

Figure 29:
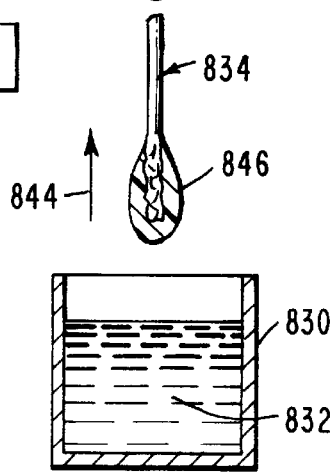

In the practice of the present invention, stick 834 is inserted sufficiently into adhesive 832 in the direction designated by arrow 842 and to the extent necessary to permit a small amount of the adhesive to cling to roughened surface 840 on stick 834. Then, as shown in FIG. 29, the stick is withdrawn from adhesive 832 and pot 830 in the direction of arrow 844 at a rate or speed which will permit the adhesive to cling to the stick in the form of an adhesive dollop 846. The quantity of adhesive contained in dollop 846 is more than that necessary for later securing of an optical fiber, such as fiber 824, to a waveguide, such as waveguide leg 816. In addition, dollop 846 at this point does not have the preferred shape.

Figure 30:
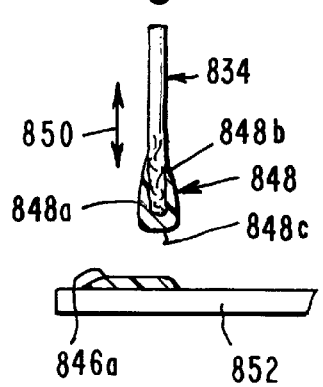

To obtain the desired shape, reference is directed to FIG. 30 where stick 834 and adhesive dollop 846 of FIG. 29 are lowered and then raised respectively in the directions of an arrow 850 to contact a compliant surface 852. This action deposits a small, excess amount 846a of dollop 846 onto compliant surface 852. The remainder of the adhesive on stick 834 is depicted in FIG. 30 and comprises a dollop 848. This shaped dollop 848 differs from dollop 846 in that its middle portion 848a has a substantially tubular thickness, as distinguished from its upper and bottom portions 848b and 848c. This uniformly uniform thickness of adhesive at middle portion 848a is an important aspect of the present invention, to insure that a later deposit of the adhesive onto the end of an optical fiber core will be of precise and uniform measure.

Figure 31:
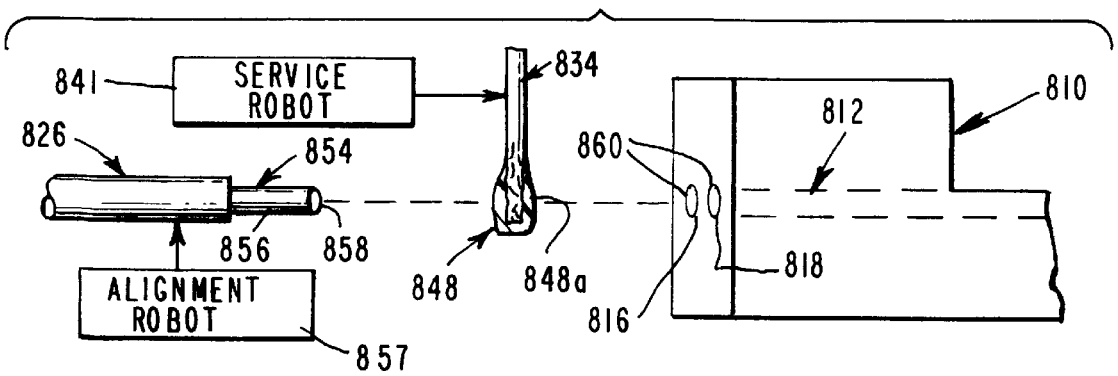

Application of the adhesive to the core of an optical fiber is illustrated in FIGS. 31 et seq. Here, optical fiber 824 includes a cladded core 854 having, for example, a diameter of 80 microns. Core 854, as is conventional, has a tip 856 whose end surface 858 is cleaved at a non-perpendicular angle to the axis of the core. Tip surface 858 is conventionally cleaved to prevent back reflection of light into the core. Waveguide leg 816 and, in particular, its end 860 of integrated optical chip 810 is positioned a precise distance from optical fiber 824 and tip 856 of core 854. This precise distance has been previously ascertained and, for example, stored in the memory of an alignment robot 857, the exact coordinates of its three axes and polarization angle having been set in the alignment robot computer memory. This position establishes the exact point of alignment that tip 856 will be positioned with respect to end 860 of waveguide 816.

In order to apply the measured amount from adhesive 848 to tip 856, the optical fiber and the core are moved back a suitable distance from chip 810, in order to permit stick 834 and its adhesive dollop 848 to be positioned between the cladded core end and waveguide end 860. This positioning is shown in FIG. 31.

Of greater importance, as shown in FIG. 32, the axis of core 854 is positioned slightly off center from axis 836 of stick 834. The precise positioning of core 854 and its cleaved oblique surface 858 at tip 856 is parallelly positioned to a tangent 862 on circumference 838 of stick 834. This parallelism between surface 858 and tangent 862 insures that a precise amount of adhesive 848 will form a uniform coating over end 856 when tip 856 is brought into contact with the adhesive, as shown in FIG. 33. Cladded core 854 is withdrawn in the direction of arrow 864, so that the core is now spaced backwards from stick 834 and adhesive 848. As shown in FIG. 34, a small amount of adhesive is uniformly deposited as a cap 868 in a substantially even manner about tip 856. This evenness of adhesive cap 868 is dependent upon the substantially uniform thickness of adhesive 848 at its middle portion 848a, and upon the parallelism between surface 858 and tangent 862.

Stick 834 is then withdrawn from its position between core 854 and integrated optic chip 810 as shown in FIG. 34. Then, before the epoxy has had a chance to set or has been caused to be set, fiber 826 is moved toward chip 810 in the direction indicated by arrow 870 to bring adhesive cap 868 into contact with waveguide end 860, and then realigned along its y and z axes, as preset by the positional information previously recorded in the computer memory of alignment robot 857, to compensate for the differences in the indices of refraction between the epoxy resin and the air. This realignment enables core 854 to move to its precise position with respect to end 860 of waveguide 816 and to form a bond 872, which is depicted in FIG. 35. The precise amount of adhesive in cap 868 which had been applied to tip 856 provides a gentle slope 874 of bond 872 to the surface of waveguide 810. FIG. 35 also shows second optical fiber 826 having a cladded core 875 secured to waveguide 818 in chip 810 by a bond 876 having a slope 878. Bond 876 is formed exactly in the same manner as bond 872. The precise and careful positioning of bonds 872 and 876 are such that there is a separation or gap 880 therebetween. This gap 880 is important because the adhesive which form bonds 872 and 876 may shrink upon curing or hardening and, therefore, create stresses on the bonds and between core 854 and waveguide 816 and between core 875 and waveguide 818. Accordingly, it is important that bonds 872 and 876 do not touch.

Although the invention has been described with respect to particular embodiments thereof, it should be realized that various changes and modifications may be made therein without departing from the spirit and scope of the invention.

What is claimed is:

1. A system for aligning and attaching input and output fibers to a waveguide, comprising:

an input optical fiber, an output optical fiber and a waveguide intermediate said fibers for being coupled therebetween, said waveguide having input and output legs;

service means establishing the three dimensional position of said waveguide by coarsely establishing the three dimensional position of said waveguide by providing orthogonal movements about the x, y and z axes;

alignment means more precisely three dimensionally and angularly aligning said input fiber with respect to said waveguide input leg and said output fiber with respect to said waveguide output leg by providing orthogonal movements about the x, y and z axes and rotational/angular movements (θ) about the x axis; and means coupled with said service means for adhering said input fiber to said waveguide input leg and said output fiber to said waveguide output leg.

2. A system for aligning and attaching input and output fibers to a waveguide, comprising:

an input optical fiber, an output optical fiber and a waveguide intermediate said fibers for being coupled therebetween, said waveguide having input and output legs;

service means for establishing the three dimensional position of said waveguide;

alignment means for three dimensionally and angularly aligning said input fiber with respect to said waveguide input leg and said output fiber with respect to said waveguide output leg, in which said alignment means includes, for each of said optical fibers, a goniometer having a pivotal axis, a holder for supporting one of said optical fibers at said pivotal axis, and means for determining the position of said one of said optical fibers with respect to said pivotal axis; and means coupled with said service means for adhering said input fiber to said waveguide input leg and said output fiber to said waveguide output leg.

3. A system for aligning and attaching input and output fibers to a waveguide, comprising:

an input optical fiber, an output optical fiber and a waveguide intermediate said fibers for being coupled therebetween, said input and said output optical fibers having respective distal ends and penultimate portions adjacent to said distal ends, and said waveguide having input and output legs;

service means for establishing the three dimensional position of said waveguide;

alignment means for three dimensionally and angularly aligning said input fiber with respect to said waveguide input leg and said output fiber with respect to said waveguide output leg, said alignment means comprising a plurality of optical fiber clamp/holders which respectively include a position maintaining optical fiber clamp and a holder positioned in series thereon, a first of said position maintaining optical fiber clamps supporting said penultimate portion of said input optical fiber and said holder supporting said distal end of said input optical fiber, and a second of said position maintaining optical fiber clamps supporting said penultimate portion of said output optical fiber and said holder supporting said distal end of said output optical fiber; and means coupled with said service means for adhering said input fiber to said waveguide input leg and said output fiber to said waveguide output leg.

4. A system according to claim 3, for enabling polarized alignment between one of said optical fibers and one of said optical waveguide legs, further comprising:

a fiber rotator positioned adjacent said waveguide and comprising a pad having a friction producing surface, and wherein each of said holders holds said one of said fibers, and comprises a vacuum holder including a housing having a channel therein coupled to a vacuum source and terminating in an inlet, and a pair of gage pins which are immovably affixed to said inlet, which are spaced from one another to provide a vacuum opening to said source, which have relatively frictionless curved surfaces so as to be sufficiently smooth, and to which said one fiber has linear contact with said curved surfaces to inhibit damage to said one fiber;

wherein, when said vacuum holder with said one fiber secured thereto by vacuum force brings said one fiber into contact with said fiber rotator, and said holder is moved essentially parallel with respect to said pad, to effect the polarized alignment.

5. A system for aligning and attaching input and output fibers to a waveguide, comprising:

an input optical fiber, an output optical fiber and a waveguide intermediate said fibers for being coupled therebetween, said waveguide having input and output legs;

service means for establishing the three dimensional position of said waveguide;

alignment means for three dimensionally and angularly aligning said input fiber with respect to said waveguide input leg and said output fiber with respect to said waveguide output leg;

means coupled with said service means for adhering said input fiber to said waveguide input leg and said output fiber to said waveguide output leg; and means for holding a third optical fiber capable of functioning in its cladding mode for initial launching of light into said waveguide output leg, and means for rastering said input fiber at said waveguide input leg to obtain initial optical communication between said third optical fiber and said input optical fiber, for enabling precise alignment thereof with said waveguide input leg by said alignment means.

6. A system for aligning and attaching input and output fibers to a waveguide, comprising:

an input optical fiber, an output optical fiber and a waveguide intermediate said fibers for being coupled therebetween, said waveguide having input and output legs;

service means for establishing the three dimensional position of said waveguide;

alignment means for three dimensionally and angularly aligning said input fiber with respect to said waveguide input leg and said output fiber with respect to said waveguide output leg;

means coupled with said service means for adhering said input fiber to said waveguide input leg and said output fiber to said waveguide output leg; and means for determining power as a function of the respective positions of each of said optical fibers, for planar position alignment thereof with respect to their respective waveguide leg.

7. A system for aligning and attaching input and output fibers to a waveguide, comprising:

an input optical fiber, an output optical fiber and a waveguide intermediate said fibers for being coupled therebetween, said waveguide having input and output legs;

service means for establishing the three dimensional position of said waveguide;

alignment means for three dimensionally and angularly aligning said input fiber with respect to said waveguide input leg and said output fiber with respect to said waveguide output leg;

means coupled with said service means for adhering said input fiber to said waveguide input leg and said output fiber to said waveguide output leg; and for each of said fibers and associated waveguide leg, further including polarization means for determining the fiber's extinction ratio as a function of its angular position ($\Theta$) with respect to said associated waveguide leg.

8. A system for aligning and attaching input and output fibers to a waveguide, comprising:

an input optical fiber, an output optical fiber and a waveguide intermediate said fibers for being coupled therebetween, said waveguide having input and output legs;

service means for establishing the three dimensional position of said waveguide;

alignment means for three dimensionally and angularly aligning said input fiber with respect to said waveguide input leg and said output fiber with respect to said waveguide output leg;

means coupled with said service means for adhering said input fiber to said waveguide input leg and said output fiber to said waveguide output leg;

fiber position recording means; and for each of said fibers and associated waveguide leg, in which an optical path exists therebetween, wherein said alignment means positions one of said optical fibers with respect to its associated waveguide, moves said one fiber towards said associated waveguide along the optical path therebetween until said one fiber contacts said associated waveguide, for recording the position of the contact in said fiber position recording means, and backs the fiber away from the contact slightly to a predetermined distance.

9. A system for aligning and attaching input and output fibers to a waveguide, comprising:

an input optical fiber, an output optical fiber and a waveguide intermediate said fibers for being coupled therebetween, said waveguide having input and output legs;

service means for establishing the three dimensional position of said waveguide;

alignment means for three dimensionally and angularly aligning said input fiber with respect to said waveguide input leg and said output fiber with respect to said waveguide output leg; and means coupled with said service means for adhering said input fiber to said waveguide input leg and said output fiber to said waveguide output leg; and a tool for attaching one of said optical fibers at its tip to its associated waveguide leg at its tip, said tool, coupled to said service means, having a roughened surface disposed to be dipped into a source of adhesive and to extract a selected amount of the adhesive from the source, and means for removing a small amount of the adhesive from said tool so as to provide thereon a remaining small amount of the adhesive having a uniformly thick portion; and wherein said alignment means positions said one optical fiber and its tip in readiness for the attachment;

said service means position said tool and the remaining small amount of the adhesive thereon between said optical fiber and waveguide leg tips;

said service means contacts said fiber tip with the uniformly thick portion of the adhesive, and withdraws said fiber tip from said uniformly thick portion of the adhesive to leave a uniform adhesive deposit on said fiber tip; and said alignment means moves said fiber tip and said adhesive deposit thereon into contact with said waveguide tip for bonding said tips together.

10. A system for aligning and attaching input and output fibers to a waveguide, comprising:

an input optical fiber, an output optical fiber and a waveguide intermediate said fibers for being coupled therebetween, said waveguide having input and output legs;

service means establishing the three dimensional position of said waveguide by coarsely establishing the three dimensional position of said waveguide by providing orthogonal movements about the x, y and z axes;

alignment means for three dimensionally and angularly aligning said input fiber with respect to said waveguide input leg and said output fiber with respect to said waveguide output leg; and means coupled with said service means for adhering said input fiber to said waveguide input leg and said output fiber to said waveguide output leg.

11. A system for aligning and attaching input and output fibers to a waveguide, comprising:

an input optical fiber, an output optical fiber and a waveguide intermediate said fibers for being coupled therebetween, said waveguide having input and output legs;

service means establishing the three dimensional position of said waveguide;

alignment means more precisely three dimensionally and angularly aligning said input fiber with respect to said waveguide input leg and said output fiber with respect to said waveguide output leg by providing orthogonal movements about the x, y and z axes and rotational/angular movements ($\theta$) about the x axis; and means coupled with said service means for adhering said input fiber to said waveguide input leg and said output fiber to said waveguide output leg.

12. A system for aligning and attaching input and output fibers to a waveguide comprising an input optical fiber, an output optical fiber and a waveguide intermediate said fibers for being coupled therebetween, said waveguide having input and output legs, characterized in that:

service means coarsely establishes the three dimensional position of said waveguide by providing orthogonal movements about the x, y and z axes;

alignment means more precisely three dimensionally and angularly align said input fiber with respect to said waveguide input leg and said output fiber with respect to said waveguide output leg by providing orthogonal movements about the x, y and z axes and rotational/angular movements ($\theta$) about the x axis; and means coupled with said service means adhesively bonds said input fiber to said waveguide input leg and said output fiber to said waveguide output leg.

* * * * *